United States Patent
Ishiyama

(10) Patent No.: US 6,531,012 B2
(45) Date of Patent: *Mar. 11, 2003

(54) PNEUMATIC TIRE DESIGNING METHOD

(75) Inventor: Makoto Ishiyama, Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,884

(22) PCT Filed: Dec. 26, 1997

(86) PCT No.: PCT/JP97/04883
§ 371 (c)(1),
(2), (4) Date: Aug. 27, 1998

(87) PCT Pub. No.: WO98/29270
PCT Pub. Date: Jul. 9, 1998

(65) Prior Publication Data
US 2001/0032694 A1 Oct. 25, 2001

(30) Foreign Application Priority Data
Dec. 27, 1996 (JP) ............................................. 8-350720

(51) Int. Cl.$^7$ .................... B29D 30/00; B60C 11/03; G06F 17/50

(52) U.S. Cl. ................................ 156/110.1; 152/209.3; 152/209.15; 152/209.28; 152/902; 703/1; 703/6; 703/8

(58) Field of Search ..................... 156/110.1; 152/209.2, 152/209.3, 209.15, 209.18, 209.28, DIG. 3, 902; 395/500.01, 500.03, 500.27, 500.28, 500.29; 73/146; 703/1, 6, 7, 8

(56) References Cited

U.S. PATENT DOCUMENTS 1,956,011 A * 4/1934 Evans ..................... 152/209.3
3,023,798 A * 3/1962 Moore et al. ............ 152/209.3

(List continued on next page.)

FOREIGN PATENT DOCUMENTS

EP 268436 * 5/1988
EP 367557 * 5/1990 .............. 152/209.3

(List continued on next page.)

OTHER PUBLICATIONS

Akasaka et al.; "Analysis of the Contact Deformation of Tread Blocks", Tire Science and Technology, TSTCA, vol. 20, No. 4, Oct.–Dec., 1992, pp. 230–253.

(List continued on next page.)

Primary Examiner—Steven D. Maki
(74) Attorney, Agent, or Firm—Sughrue Mion, PLLC

(57) ABSTRACT

When a single performance or a plurality of antinomical performances are to be achieved, the best mode of a tire is designed under a given constraint condition. Each of blocks included in two pitch groups designated in a pitch array is modeled (100), an objective function representing a tire performance evaluation physical amount, a constraint condition for restricting a tire shape, and a design variable which is an angle of a wall surface determining each of block shapes are determined (102). Next, the design variable is varied continuously by $^\Delta r_i$ to determine a modified model (104 to 108). A value of the objective function of the modified model and a value of the constraint condition are calculated, and a sensitivity of the objective function and a sensitivity of the constraint condition are determined (110, 112). A variation amount of the design variable which minimizes a difference between block rigidities is estimated, a modified shape model is determined, the objective function is calculated, and by using a value of the design variable, a block shape of each of the pitch groups in the pitch array forming the tire is determined (114 to 120).

16 Claims, 37 Drawing Sheets

U.S. PATENT DOCUMENTS

| | | | | |
|---|---|---|---|---|
| 4,690,189 A | * | 9/1987 | Bradisse et al. | 152/209.15 |
| 4,777,993 A | * | 10/1988 | Yamashita et al. | |
| 4,815,511 A | * | 3/1989 | Brayer et al. | 152/209.15 |
| 5,178,698 A | * | 1/1993 | Shibata | |
| 5,205,879 A | * | 4/1993 | Seitz et al. | 152/209.3 |
| 5,559,729 A | * | 9/1996 | Abe | 395/500.01 |
| 5,617,341 A | * | 4/1997 | Nakajima | 152/209.2 |
| 5,710,718 A | * | 1/1998 | Kamegawa et al. | 395/500.27 |
| 5,714,026 A | * | 2/1998 | Wakabayashi | 156/110.1 |

FOREIGN PATENT DOCUMENTS

| | | | | |
|---|---|---|---|---|
| EP | 591002 | * | 4/1994 | 152/209.3 |
| EP | 612631 | * | 8/1994 | 152/209.3 |
| EP | 629519 | * | 12/1994 | |
| EP | 688685 | * | 12/1995 | 152/209.28 |
| GB | 1549347 | * | 8/1979 | 152/209.15 |
| JP | 58-50883 | | 11/1983 | |
| JP | 62-157810 | | 7/1987 | |
| JP | 63-23925 | | 5/1988 | |
| JP | 1-195103 | | 8/1989 | |
| JP | 2-109705 | * | 4/1990 | 152/209.3 |
| JP | 2-127103 | | 5/1990 | |
| JP | 2-141310 | * | 5/1990 | 152/209.15 |
| JP | 2-147414 | | 6/1990 | |
| JP | 3-92403 | | 4/1991 | |
| JP | 4-232105 | | 8/1992 | |
| JP | 6-143940 | | 5/1994 | |
| JP | 7-52610 | | 2/1995 | |
| JP | 7-149114 | | 6/1995 | |
| JP | 7-164815 | | 6/1995 | |
| JP | 7-186623 | | 7/1995 | |
| WO | WO 94/16877 | | 8/1994 | |

OTHER PUBLICATIONS

Walters, M.H.; "Uneven Wear of Vehicle Tires", Tire Science and Technology, TSTCA, vol. 21, No. 4, Oct.–Dec. 1993, pp. 202–219.

Murakoshi et al.; "An Approach to Vehicle Pull Using a Tire Finite Element Model", Tire Science and Technology, TSTCA, vol. 20, No. 4, Oct.–Dec., 1992, pp. 212–229.

Danielson et al.; "Computational Strategies for Tire Modeling and Analysis", Computers & Structures, vol. 61, Issue: 4, Nov. 1996, pp. 673–693.

* cited by examiner

⟨CONVENTIONAL SHAPE⟩     ⟨OPTIMIZATION OF GROOVE WALL ANGLE⟩

FIG. 30
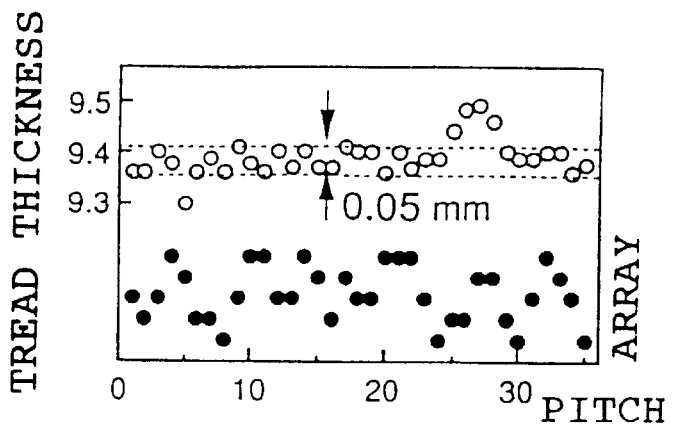
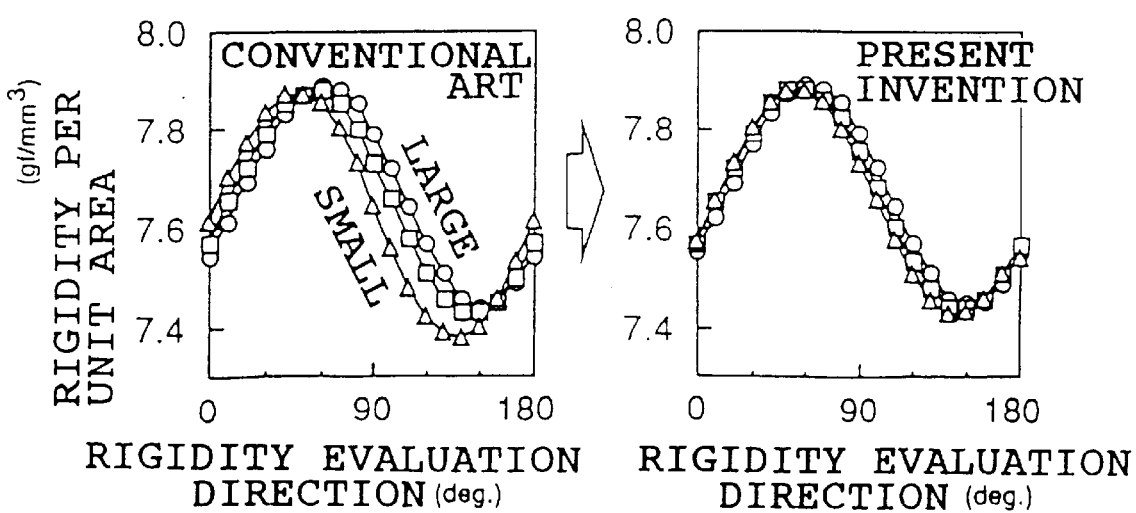
FIG. 31A     FIG. 31B

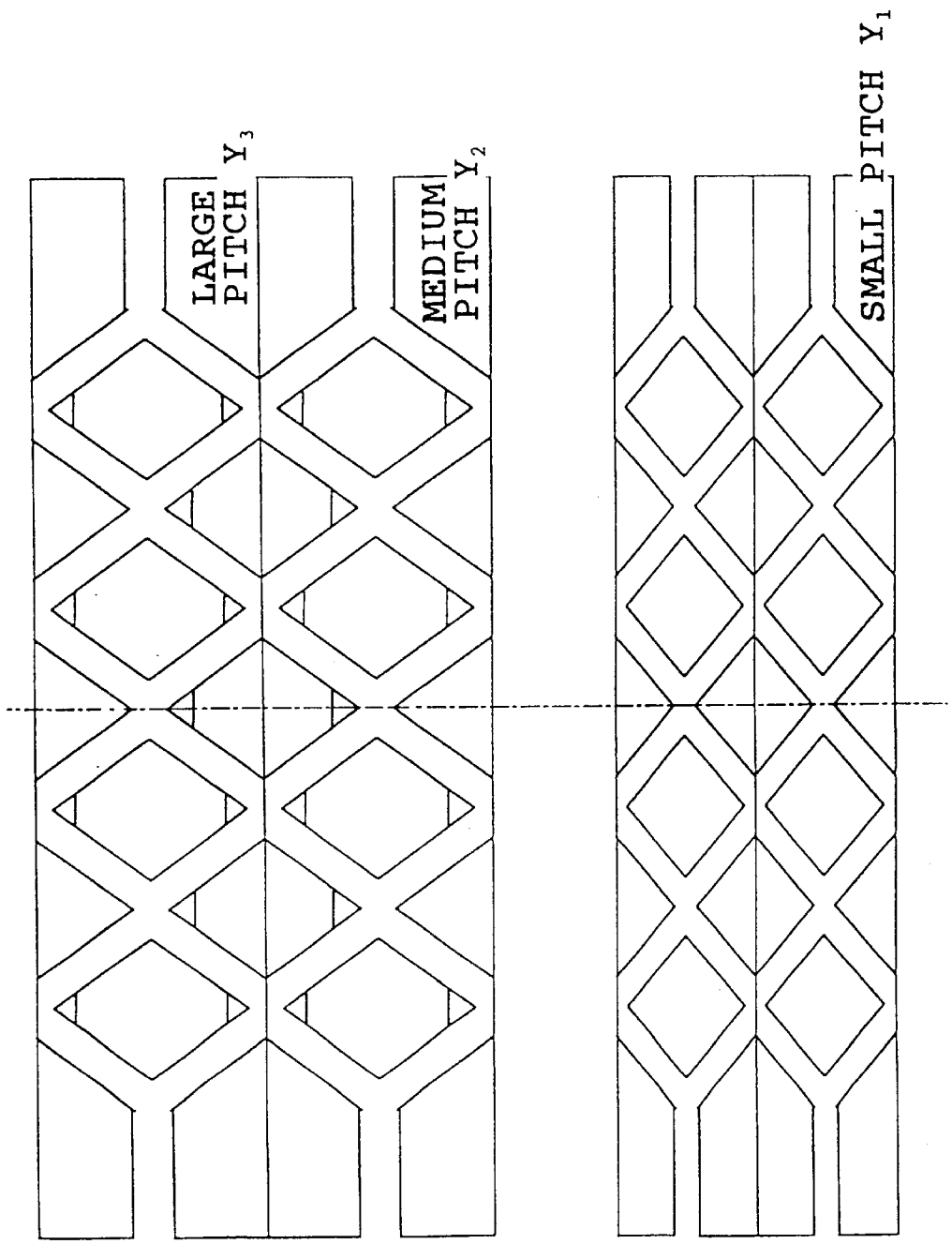

FIG. 35A
NORMAL DESIGN
FIG. 35B
CHAMFERED BLOCK OF PRESENT INVENTION
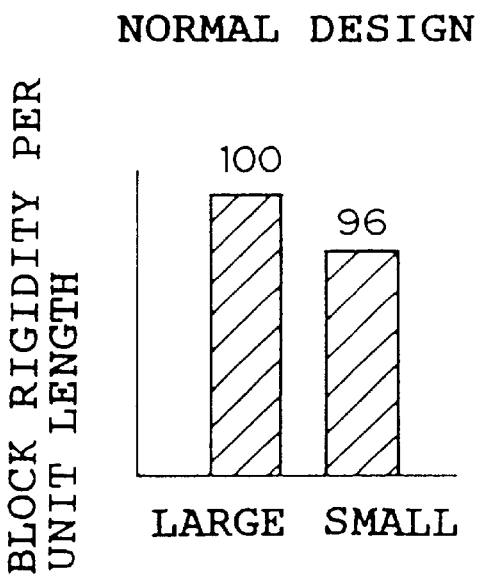
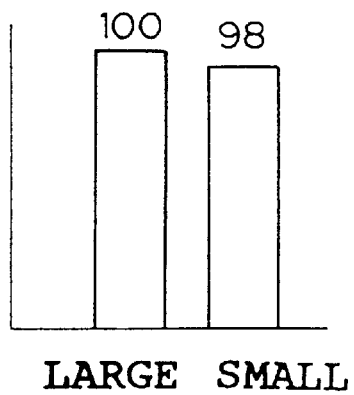
IN CIRCUMFERENTIAL DIRECTION (0°)

IN CIRCUMFERENTIAL DIRECTION (90°)

PNEUMATIC TIRE DESIGNING METHOD

TECHNICAL FIELD

The present invention relates to a method for designing a pneumatic tire, and more particularly, to a method for designing a pneumatic tire capable of efficiently and easily designing the development of a design such as a tire structure, shape, and the like which achieve a single object performance, antinomical performances, and the like.

BACKGROUND ART

Conventional methods for designing tires are based on empirical rules achieved by a repetition of numerical experiments using actual experimentation and computers. Therefore, the number of trials and tests required for development is extremely large, which increases development costs, and the development time period cannot be shortened easily.

For example, the shape of the crown portion of a tire is designed on the basis of several arcs in a cross-sectional configuration including a rotational axis of the tire. A value of an arc is determined from data obtained by preparing several molds and testing and evaluating tires prepared from the molds, or is determined by conducting many numerical experiments. Therefore, the development efficiency is not good.

Further, pattern design has many degrees of freedom. Therefore, after grooving a proposed basic pattern in a tire or after actually preparing a mold, a trial tire is made and tested on a vehicle and evaluated. Problems arising at the vehicle are overcome by finely modifying the proposed basic pattern to complete a final pattern. Thus, pattern design is in a field requiring the most processes, as compared with the designing of tire shape and structure.

A pneumatic tire is generally formed with rib grooves in a circumferential direction of the tire and lug grooves in a radial direction of the tire, so as to prevent the hydroplaning phenomenon which is generated during vehicle running in rain, and so as to ensure the braking performance and traction performance. A general pattern is a so-called block pattern which includes island shaped land portions surrounded by these rib grooves and lug grooves.

Such a block pattern requires running performances of the tire, in general, both a straight running performance and a cornering performance. The straight running performance requires a grip force in a circumferential direction of the tire, and a relatively hard rubber is suitable. On the other hand, the cornering performance requires a grip force in a widthwise direction of the tire, and a relatively soft rubber is suitable to increase the grip force during cornering. Due to the soft rubber, there is the need to increase energy loss, which is antinomical.

Therefore, a theoretical approach has recently been made to design a tire which is quiet and safe during running at a high speed on a dry, wet or icy road. Grooves and the like forming the tread of the tire are designed by a plurality of variable pitch repetition design cycles in accordance with a standard which is mathematically calculated. Based on the design values, a tread having land portions divided by lateral grooves and circumferential grooves which define pitches and pitch arrays on the circumference of the tire is obtained. Here, the term "pitch" means a relative length of the land portion, and the term "pitch array" means a sequence of pitches used on the circumference of the tire. A ratio of a pitch length (pitch ratio) may be used as the pitch in some cases.

Each of the pitches may have different length, but in terms of practicality, the lengths are limited to about nine kinds. A particular length of a particular pitch in a given pitch array differs depending upon the circumference of the tire (see Japanese Patent Application Laid-Open No. 4-232105).

However, in many cases, the pitch and pitch array are determined for enhancing the sound performance or for preventing the hydroplaning phenomenon, or are determined by design requirements so as to match the aesthetic sense of the consumer. Further, a plurality of pitches are repeatedly used in the pitch array. Therefore, rigidities are not uniform among land portions of different pitches. Thus, there are problems that uneven wear is increased, and roundness during manufacturing deteriorates.

In view of the above circumstances, it is an object of the present invention to provide a method for designing a pneumatic tire, in which when a plurality of antinomical performances are to be obtained, the best mode of a tire is designed under a given condition, and in which the tire can be efficiently designed and developed.

DISCLOSURE OF THE INVENTION

To achieve the above object, according to an embodiment of the invention, there is provided a method for designing a pneumatic tire including the steps of: (a) determining: a tire basic model including a plurality of different basic shape models representing one shape selected from among a shape of a block alone including an internal structure, a pattern shape of a portion of a tire crown portion including an internal structure, and a shape of a land portion which is continuous in a tire circumferential direction including an internal structure; an objective function representing a tire performance evaluation physical amount; a design variable for determining the shape of the block alone, the pattern shape, or the shape of the land portion; and a constraint condition for restricting at least one of the shape of the block alone, the pattern shape, and the shape of the land portion, and for restricting at least one of a tire cross-sectional shape and the tire performance evaluation physical amount; (b) determining a value of the design variable, until an optimal value of the objective function is obtained, by calculation while varying the value of the design variable and while taking the constraint condition into account; and (c) designing the tire on the basis of the design variable which provides the optimal value of the objective function.

There is also provided in the method for designing a pneumatic tire that the design variable is for determining another shape of the block alone, another pattern shape or another shape of the land portion, by using at least one of the different basic shape models as a reference shape model.

Also provided in the method for designing a pneumatic tire, the shape of the block alone, the pattern shape or the shape of the land portion is determined by using a predetermined basic shape model of the plurality of different basic shape models as a reference model.

There is also provided in the method for designing a pneumatic tire that in the step (b) discussed above, a variation amount of the design variable which provides the optimal value of the objective function while taking the constraint condition into account is estimated based on a sensitivity of the objective function, which is a ratio of a unit variation amount of the design variable to a variation amount of the objective function, and based on a sensitivity of the constraint condition, which is a ratio of a unit variation amount of the design variable to a variation amount of the constraint condition; a value of the objective function when the design variable is varied by an amount corresponding to the estimated amount is calculated and a value of the constraint condition when the design variable is varied by an amount corresponding to the estimated amount is calculated; and a value of the design variable which provides the optimal value of the objective function while taking the constraint condition into account is determined on the basis of the estimated values and the calculated values.

In the method for designing a pneumatic tire discussed above, a selection group including a plurality of tire basic models including a plurality of different basic shape models representing one shape selected from among a shape of a block alone including an internal structure, a pattern shape of a portion of a tire crown portion including an internal structure, and a shape of a land portion which is continuous in a tire circumferential direction including an internal structure is determined; and for each of the tire basic models of the selection group, the objective function, the design variable, the constraint condition, and an adaptive function which can be evaluated from the objective function and the constraint condition are determined; and in the step (b), two tire basic models are selected from the selection group on the basis of adaptive function; design variables of the tire basic models are crossed at a predetermined probability to create a new tire basic model, and/or a portion of the design variable of at least one of the tire basic models is varied to create a new tire basic model; an objective function, a constraint condition and an adaptive function of the tire basic model whose design variable has been varied are determined, the tire basic model and a tire basic model whose design variable has not been whose design variable has been varied are stored, the above operations are repeated until the number of stored tire basic models reaches a predetermined number, it is determined whether a new group including the predetermined number of stored tire basic models satisfies a predetermined convergence condition, and when the convergence condition is not satisfied, the above operations are repeated, by using the new group as the selection group, until the selection group satisfies the convergence condition, and when the convergence condition is satisfied, a value of the design variable which provides the optimal value of the objective function while taking the constraint condition into account is determined from among the predetermined number of stored tire basic models.

There is also provided a method for designing a pneumatic tire, wherein the design variable discussed above includes a variable which represents at least one of: an angle of a surface connected to a surface of the tire land portion which is formed by one shape selected from the shape of the block alone, the pattern shape, and the shape of the land portion; a height to the surface of the tire land portion; a shape of a surface of the tire land portion; a shape of a surface connected to a surface of the tire land portion; a position of a sipe; a number of sipes; a width of a sipe; a depth of a sipe; an inclination of a sipe; a shape of a sipe; and a longitudinal shape of a sipe.

Also provided is a method for designing a pneumatic tire as discussed above, wherein each of the tire basic models including a plurality of basic shape models has a different length in the tire circumferential direction.

Step (a) discussed above determines: a tire basic model including a plurality of different basic shape models representing one shape selected from among a shape of a block alone including an internal structure, a pattern shape of a portion of a tire crown portion including an internal structure, and a shape of a land portion which is continuous in a tire circumferential direction including an internal structure; an objective function representing a tire performance evaluation physical amount; a design variable for determining the shape of the block alone, the pattern shape, or the shape of the land portion; and a constraint condition for restricting at least one of the shape of the block alone, the pattern shape, and the shape of the land portion, and for restricting at least one of a tire cross-sectional shape and the tire performance evaluation physical amount. Each of the block alone including the internal structure, the tire crown portion, and the land portion which is continuous in the tire circumferential direction includes a medium made of single rubber.

The basic shape model representing the shape of the block alone can be formed from a function representing a line which specifies the outer surface shape of the block alone or from a variable representing a coordinate value of an inflection point. The basic shape model representing a pattern shape of a portion of the tire crown portion including an internal structure can be formed from a function which can geometrically analyze the pattern shape at the ground-contacting side of the ground-contacting surface of one land portion of the tire crown portion, e.g., can be formed from a function for determining a polygonal shape such as a rectangular shape or rhombus shape. The basic shape model representing a shape of a land portion which is continuous in the tire circumferential direction including an internal structure can be formed from a function representing a line showing a tire cross-sectional shape or a variable representing the coordinates of an inflection point.

Each of the basic shape models may include at least one of: an angle of a surface connected to a surface of the tire land portion which is formed by one shape selected from the pattern shape and the shape of the land portion; a height to the surface of the tire land portion; a shape of a surface of the tire land portion; a shape of a surface connected to a surface of the tire land portion; a position of a sipe; a number of sipes; a width of a sipe; a depth of a sipe; an inclination of a sipe; a shape of a sipe; and a longitudinal shape of a sipe. Further, as the basic shape model, a model formed by a technique called the finite element method which divides into a plurality of elements may be used, or a model formed by an analytical technique may be used.

The tire basic model includes a plurality of different basic shape models among the basic shape models. For example, in order to design by a plurality of variable pitch repetition design cycles, a tread having land portions which define the pitches and the pitch array on the tire circumference maybe modeled. In this case, a plurality of different pitches are formed on the tire circumference. As the tire basic model, a model by a technique called the finite element method which divides into a plurality of elements may be used, or a model by an analytical technique may be used.

As described above, the tire basic models, i.e., each of the tire basic models having a plurality of basic shape models may have different lengths in a tire circumferential direction. Among tires, there are tires (so-called pitch variation tires) at which land portions are formed on the circumference of the tire at a plurality of different pitches in order to improve the steering stability and quietness. In many cases, in a pitch variation tire, only the length in circumferential direction is varied. Therefore, by using a plurality of basic shape models, in which the lengths in circumferential direction are different, as the tire basic model, it is easy to design a pitch variation tire.

As the objective function representing the performance evaluation physical amount, a physical amount which influences the running performance of the tire such as block rigidity can be used. As the design variable which determines the shape of the block alone or the pattern shape or the shape of the land portion, a variable can be used to determine the pattern, which variable which represents at least one of: an angle of a surface connected to a surface of the tire land portion which is formed by one shape selected from the shape of the block alone, the pattern shape, and the shape of the land portion (i.e., an angle of a block groove wall in the case that a block alone is used); a height to the surface of the tire land portion (i.e., the depth of a groove if a groove is formed); a shape of a surface of the tire land portion; a shape of a surface connected to a surface of the tire land portion; a position of a sipe; the number of sipes; a width of a sipe; a depth of a sipe; an inclination of a sipe; a shape of a sipe; and a longitudinal shape of a sipe. As the constraint conditions, there are the constraint of the tread thickness, the constraint of the block rigidity, the constraint of the angle of the side surface of the land portion formed on the tire (e.g., an angle of a block groove wall in the case that a block alone is used) and the like. The objective function, the design variable and the constraint condition are not limited to the examples described above, and various elements can be used as the objective function, the design variable and the constraint condition in accordance with the purpose of the tire design.

In next step (b), while taking the constraint condition in account, a value of the design variable is obtained by calculation while varying the value of the design variable until an optimal value of the objective function is provided. In this case, it is effective that a variation amount of the design variable which provides the optimal value of the objective function while taking the constraint condition into account is estimated based on a sensitivity of the objective function, which is a ratio of a unit variation amount of the design variable to a variation amount of the objective function, and based on a sensitivity of the constraint condition, which is a ratio of a unit variation amount of the design variable to a variation amount of the constraint condition; a value of the objective function when the design variable is varied by an amount corresponding to the estimated amount is calculated and a value of the constraint condition obtained when the design variable is varied by an amount corresponding to the estimated amount is calculated; and a value of the design variable which provides the optimal value of the objective function while taking the constraint condition into account is determined on the basis of the estimated value and the calculated values. As a result, a value of the design variable when the value of the objective function taking the constraint condition into account is optimal is obtained.

In step (c), the tire is designed by changing the tire basic models on the basis of the design variable which provides the optimal value of the objective function.

Therefore, for a tire basic model including a plurality of different basic shape models, the design variable which provides the optimal value of the objective function, i.e., a selected basic shape model representing the shape of a block alone or a pattern shape or the shape of a land portion, is determined. For example, a shape which is determined by a certain pitch on the tire circumference is obtained, and it is possible to design a tire having uniform rigidities.

The design variable is for determining another shape of the block alone, another pattern shape or another shape of the land portion, by using at least one of the different basic shape models as a reference shape model. By setting in this manner, and by using as a reference the basic shape model which is set as the reference shape model, it is possible to design a tire having uniformized rigidities along such a reference shape model.

Further, the design variable can be set so as to determine the shape of a block alone, a pattern shape or a shape of a land portion by using a predetermined basic shape model as a reference model. By setting in this manner, and by using as a reference the basic shape model which is set as a reference shape model, it is possible to design a tire having uniform rigidities along such a reference shape model. That is, in order to uniformize the rigidities or the like, by setting the basic shape model in advance as an estimated value, and by using as a reference the basic shape model set as the estimated value, it is possible to design a tire having uniform rigidities along the reference shape model.

In the step (a), a selection group including a plurality of tire basic models including a plurality of different basic shape models representing one shape selected from among a shape of a block alone including an internal structure, a pattern shape of a portion of a tire crown portion including an internal structure, and a shape of a land portion which is continuous in a tire circumferential direction including an internal structure is determined; and for each of the tire basic models of the selection group, the objective function, the design variable, the constraint condition, and an adaptive function which can be evaluated from the objective function and the constraint condition are determined.

Next, in the step (b), two tire basic models are selected from the selection group on the basis of the adaptive function; design variables of the tire basic models are crossed at a predetermined probability to create a new tire basic model, and/or a portion of the design variable of at least one of the tire basic models is varied to create a new tire basic model; an objective function, a constraint condition and an adaptive function of the tire basic model whose design variable has been varied are determined, the tire basic model whose design variable has been varied and a tire basic model whose design variable has not been varied are stored, the above operations are repeated until the number of stored tire basic models reaches a predetermined number, it is determined whether a new group including the predetermined number of stored tire basic models satisfies a predetermined convergence condition, and when the convergence condition is not satisfied, the above operations are repeated, by using the new group as the selection group, until the selection group satisfies the convergence condition, and when the convergence condition is satisfied, a value of the design variable which provides the optimal value of the objective function while taking the constraint condition into account is determined from among the predetermined number of stored tire basic models. Based on the value of the design variable which provides the optimal value of this objective function, the tire basic model is changed in step (c), to thereby design the tire.

In this case, in the step (b), for the tire basic model whose design variable has been varied, it is further effective that a variation amount of the design variable which provides the optimal value of the objective function while taking the constraint condition into account is estimated based on a sensitivity of the objective function, which is a ratio of a unit variation amount of the design variable to a variation amount of the objective function, and based on a sensitivity of the constraint condition, which is a ratio of a unit variation amount of the design variable to a variation amount of the constraint condition; a value of the objective function when the design variable is varied by an amount corresponding to the estimated amount is calculated and a value of the constraint condition when the design variable is varied by an amount corresponding to the estimated amount is calculated; the adaptive function is obtained from the value of the objective function and the value of the constraint condition, and the tire basic model and a tire basic model whose design variable has not been varied are stored, and the above operations are repeated until the number of stored tire basic models reaches a predetermined number. With this method as well, it is possible to obtain the value of the design variable in which the value of the objective function becomes optimal while taking the constraint condition into account. As the adaptive function which can be evaluated from the objective function and the constraint condition, a function for determining fitness with respect to the tire basic model from the objective function and the constraint condition can be used. Further, the objective function, the design variable, the constraint condition and the adaptive function are not limited to the above examples only, and various elements can be determined in accordance with the purpose of the tire designing. Further, for crossing the design variables of the tire basic models, there is a method in which portions of design variables of selected two tire models or design variables after a predetermined region are exchanged. Furthermore, for changing a portion of the design variable of the tire basic model, there is a method in which a design variable at a position which is previously determined by probability or the like is changed (mutated).

As described above, according to the present invention, a design variable which provides the optimal value of the objective function while taking the constraint condition into account is determined, and from this design variable, a tire including different block shapes, patterns or the like can be designed. Therefore, unlike the conventional design and development based on trial and error, operations from designing of the best mode to evaluating the performance of the designed tire are made possible to a certain extent mainly by using a computer, efficiency can be remarkably enhanced, the cost of development is reduced, and the block shape or the pattern forming a tire can be designed in accordance with the purpose of use.

BRIEF DESCRIPTION OF THE DRAWINGS

FIGS. 25A and 25B are diagrams showing rigidity per unit area with respect to direction, wherein FIG. 25A shows conventional rigidity before optimization for making tread thickness uniform, and FIG. 25B shows rigidity after optimization for making tread thickness uniform according to the fourth embodiment.

FIGS. 29A to 29D show results of indoor uniformity of a tire formed by using the pitch array according to the structure of the fifth embodiment, wherein FIG. 29A shows results of RFV, FIG. 29B shows results of high speed RFV, FIG. 29C show results of high speed TFV and FIG. 29D shows results of LFV.

FIG. 30 is a diagram showing results of measurement of tread thickness according to fifth embodiment.

FIGS. 31A and 31B are diagrams showing rigidity per unit area with respect to direction of different tires according to the fifth embodiment, wherein FIG. 31A shows conventional rigidities, and FIG. 31B shows rigidities after optimization for making tread thickness uniform and making rigidity uniform according to the fifth embodiment.

FIG. 34 is a view for explaining positions to be chamfered in the circumferential direction of tire for small pitch, medium pitch and large pitch blocks according to the first example.

FIGS. 35A and 35B show block rigidities of chamfered blocks according to the first example, wherein FIG. 35A shows rigidities of conventional blocks, and FIG. 35B shows rigidities of blocks according to the first example.

FIGS. 37A and 37B show block rigidities of chamfered blocks according to the second example, wherein FIG. 37A shows rigidities of conventional blocks, and FIG. 37B shows rigidities of blocks according to the first example.

BEST MODE FOR CARRYING OUT THE INVENTION

One example of a mode for carrying out the invention will be described in detail below with reference to the accompanying drawings.

Figure 1:
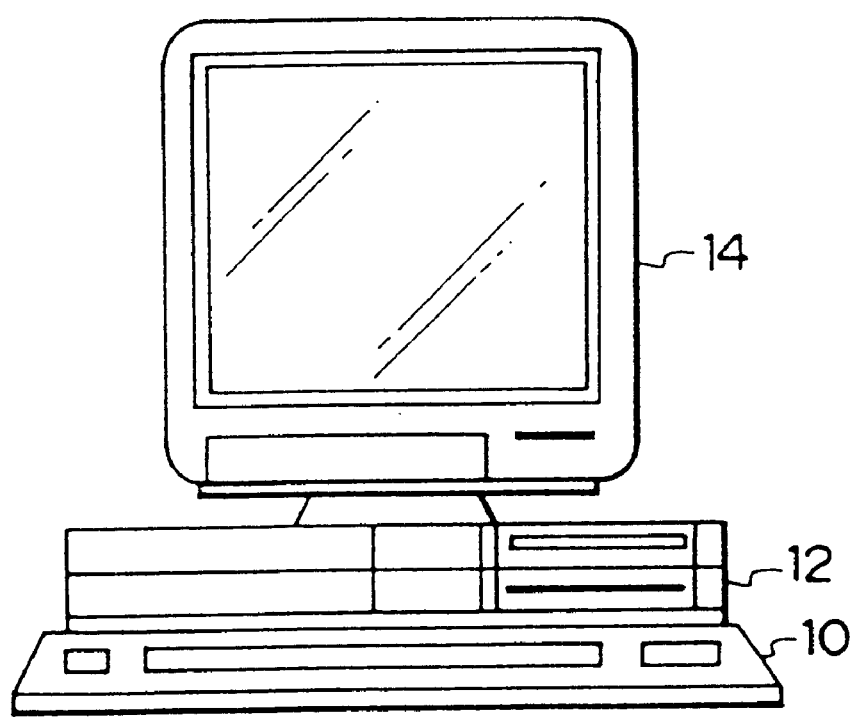
FIG. 1 is a schematic view of a personal computer used in embodiments of the present invention.

FIG. 1 is a schematic view of a personal computer for carrying out the method for designing a pneumatic tire of the present invention.

The personal computer comprises a keyboard 10 for inputting data and the like, a computer main body 12 for calculating, in accordance with a program stored in advance, design variables which satisfy constraint conditions and which optimize, e.g., maximize or minimize an objective function. The personal computer further comprises a CRT 14 displaying calculation results of the computer main body 12 and the like.

First Embodiment

A first embodiment will be described first. The first embodiment is to determine the tire shape by uniformizing differences between block rigidities, in order to enhance the steering stability and uneven wear resistance for a tire having a plurality of pitches and a pitch array in which the plurality of pitches are arranged, the pitches and the pitch array being determined so as to enhance a degree of quiet so that there is little noise during running.

Each of the plurality of pitches has a pitch length. In order to simplify the calculation, it is possible to make the pitch correspond to a value which is obtained by changing the ratio of pitch lengths (hereinafter, pitch ratio) into an integer. For example, if a large pitch, a medium pitch and a small pitch are included, each is made to correspond to an integer.

Further, the expression "to uniformize differences between block rigidities" means to make coincident or substantially make coincident the distributions of rigidities among a plurality of pitch groups having different pitches but whose adjacent pitches are the same, i.e., to make the difference in rigidities zero in the pitch array.

Figure 3:
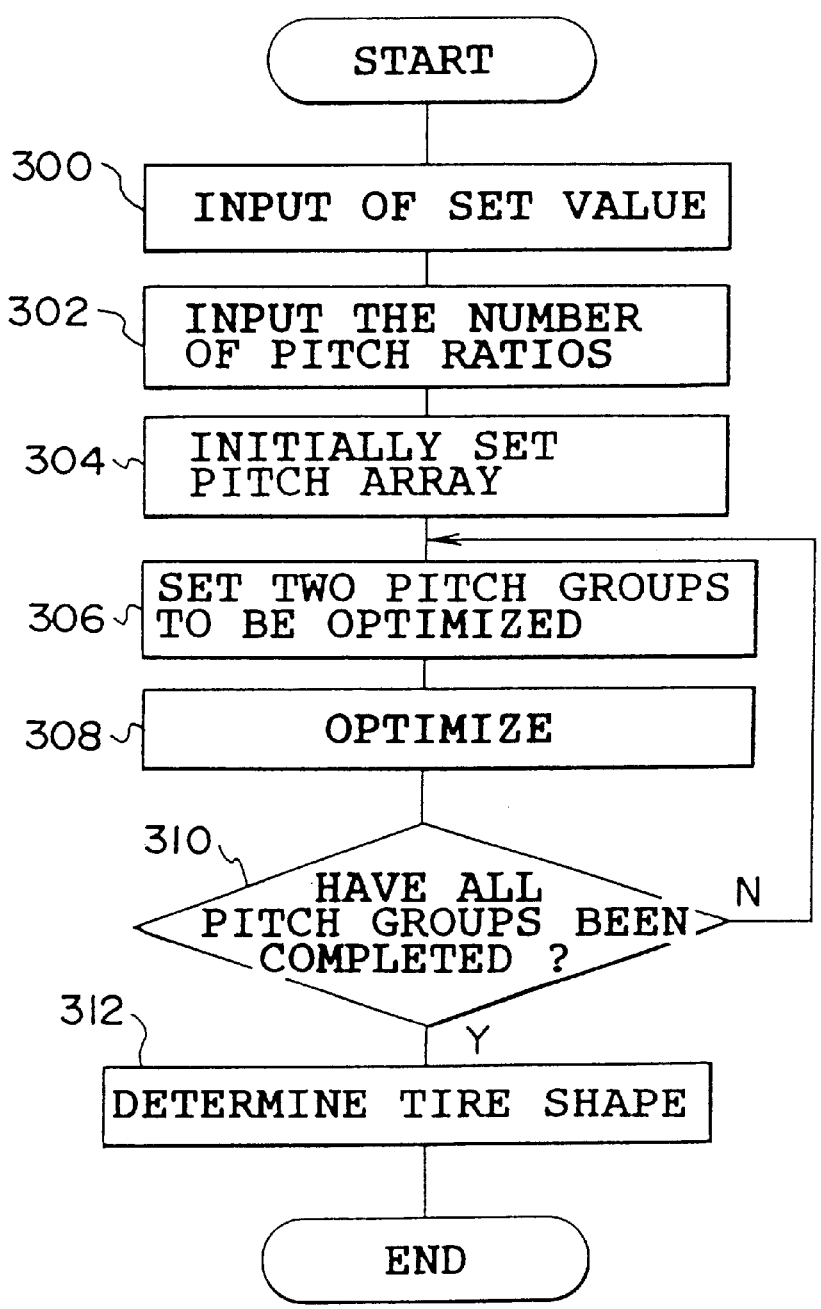
FIG. 3 is a flowchart showing a flow of a tire shape design processing routine according to a first embodiment of the present invention.

FIG. 3 shows a processing routine of a program of the present embodiment. In steps 300 to 304, numerical values are input to make is possible to numerically and analytically treat the pitch array formed on the tread of a tire.

More specifically, in step 300, a value necessary to form a pitch array of a quiet tire which is determined in advance, or an experimentally obtained value is input as a set value. Examples of the set value are the total number N of pitches, the maximum pitch (pitch ratio: $\alpha_{max}$=11.0), the minimum pitch (pitch ratio: $\alpha_{min}$=7.0). A value of a pitch length itself may be input.

In step 302, the number M of kinds of pitches (M is a natural number, 3 is used as any one of 2 to 9 in the present embodiment) is determined. In step 304, a pitch array V, in which the number of kinds of pitches included in the pitch array is M and the total number of pitches is N, is input. This pitch array V is the initial value.

That is, by making the M pitches Yi ($1 \leq i \leq 3$) correspond to natural numbers from 1 to 9, and by designating an array having N digits since the total number of pitches is N, there is created the pitch array V in which the pitch is represented in correspondence to each digit which is a natural number which is an array value. This pitch array v has been obtained by experiment or calculation previously.

Figure 2:
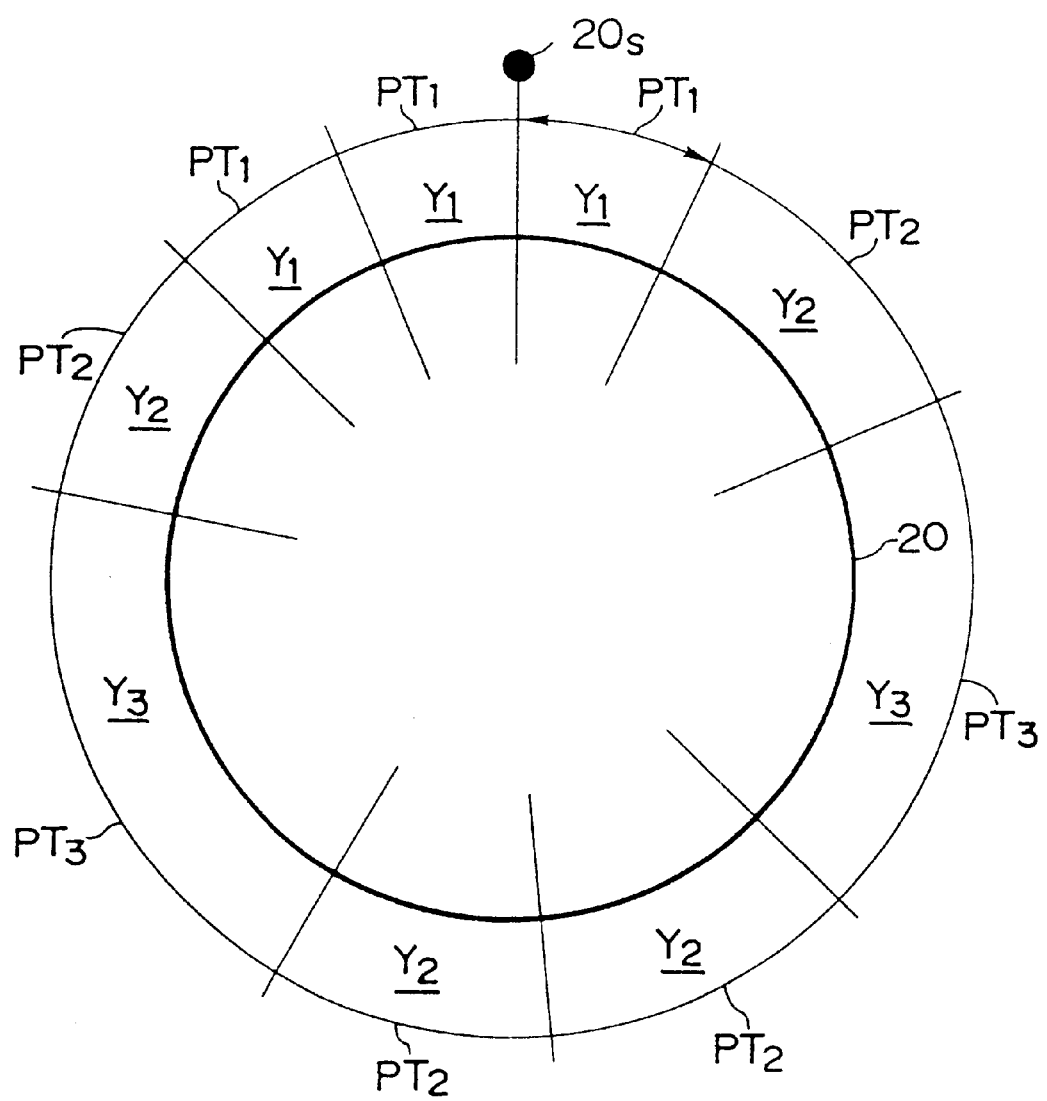
FIG. 2 is an image view showing a shape of a tire by pitches and a pitch array.

As shown in FIG. 2, a tire 20 determined by the pitch array V comprises three kinds of pitches, i.e., a small pitch $Y_1$, a medium pitch $Y_2$ and a large pitch $Y_3$. Formed on the tire 20 are a pitch group $PT_1$ in which the small pitches $Y_1$ are continuously arranged, a pitch group $PT_2$ in which the medium pitches $Y_2$ are continuously arranged, and a pitch group $PT_3$ in which the large pitches $Y_3$ are continuously arranged. In the case shown in FIG. 2, the pitch array V is formed such that pitch groups $PT_1$, $PT_2$, $PT_3$, $PT_2$, $PT_2$, $PT_3$, $PT_2$, $PT_1$ and $PT_1$ are arranged continuously in a clockwise direction from a reference 20s of the tire 20.

In the present embodiment, a case is described in which the pitch groups $PT_1$, $PT_2$ and $PT_3$ comprise the plural pitches in which the small pitch $Y_1$, the medium pitch $Y_2$, the large pitch $Y_3$ are arranged continuously. However, the present invention is not limited to the same, and the pitch groups $PT_1$, $PT_2$ and $PT_3$ may comprise a single pitch. That is, at least one of the pitch groups $PT_1$, $PT_2$ and $PT_3$ may comprise only any one of the small pitch $Y_1$, the medium pitch $Y_2$ and the large pitch $Y_3$.

As described above, in the tire 20 having a plurality of pitch groups in which predetermined pitches are arranged continuously and having a plurality of different pitch groups, there is a difference in rigidities among the pitch groups. That is, generally, a small pitch block has a small rigidity in a circumferential direction of a tire, but has a large rigidity in a widthwise direction of the tire. On the other hand, a large pitch block has a large rigidity in a circumferential direction of a tire, but has a small rigidity in a widthwise direction of the tire. In this way, there is a difference in rigidity between the small pitch group and the large pitch group. Therefore, in step 306, two pitch groups are designated, and in step 308, optimization for uniformizing rigidities of the pitch groups is carried out.

That is, in step 306, two pitch groups of the tire 20 specified by the pitch array V are designated. In the present embodiment, a case in which the large pitch group $PT_3$ and the small pitch group $PT_1$ are designated will be described. In next step 308, these pitch groups $PT_1$ and $PT_3$ are optimized by the optimizing routine shown in FIG. 4.

Figure 4:
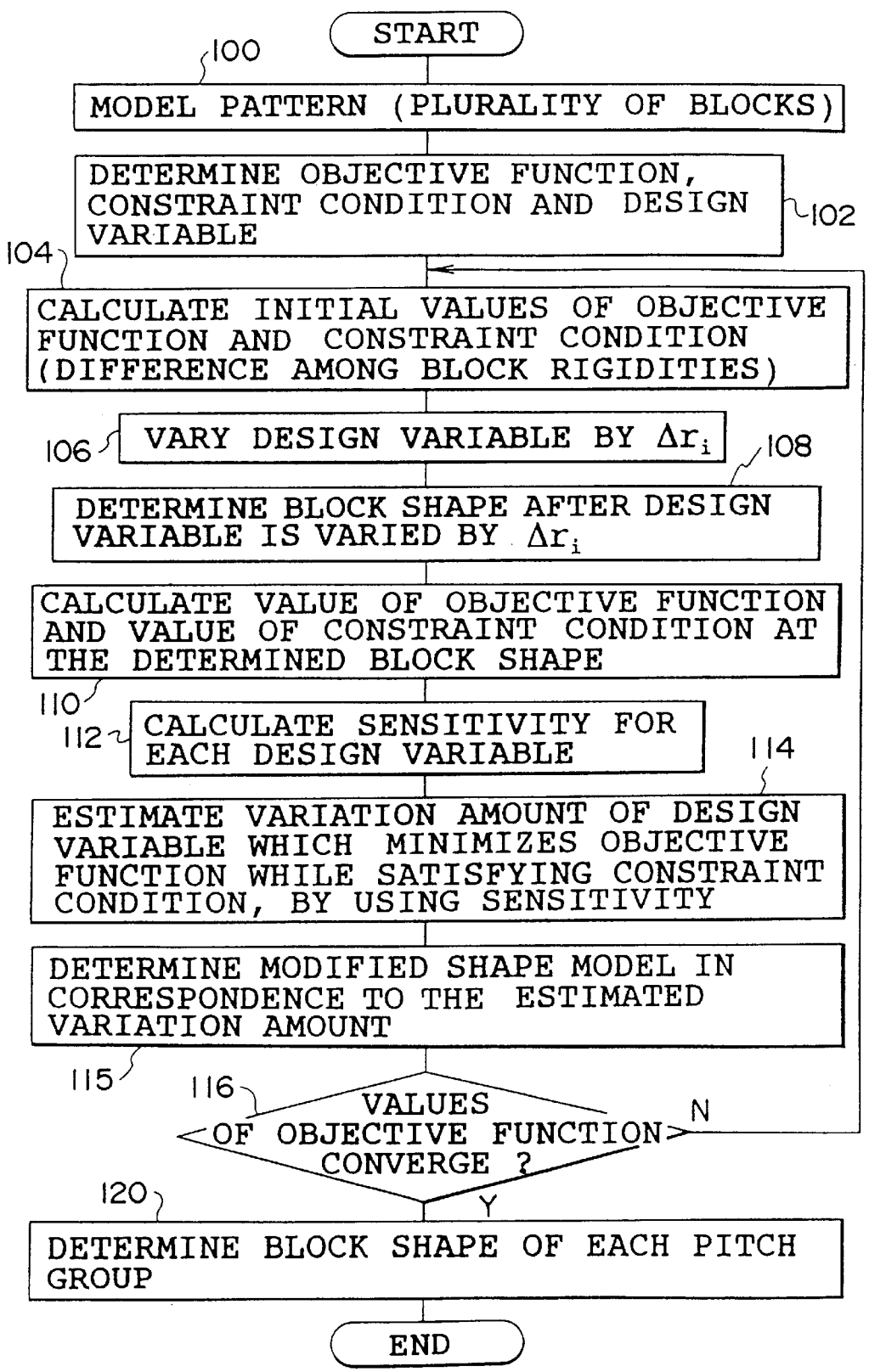
FIG. 4 is a flowchart showing a flow of an optimizing routine.

In step 100 in FIG. 4, one block of the tire shape specified by the pitch array is used as a reference shape, and the reference shape of each of blocks $BL_1$ and $BL_3$ included in the two pitch groups $PT_1$ and $PT_3$ specified in step 306 are modeled by a technique which can numerically and analytically obtain the block rigidity, such as the finite element method. A tire shape including an internal structure is expressed, and, for every pitch group, a basic shape model divided into a plurality of elements by mesh division is obtained. The reference shape is not limited to one block of a tire shape in the naturally balanced state, and may be an arbitrary shape. Here, the term "is modeled" means to convert the tire shape, structure, material and pattern into numerical values in data style for inputting into a computer program which has been prepared based on a numerical and analytical technique.

Figure 6:
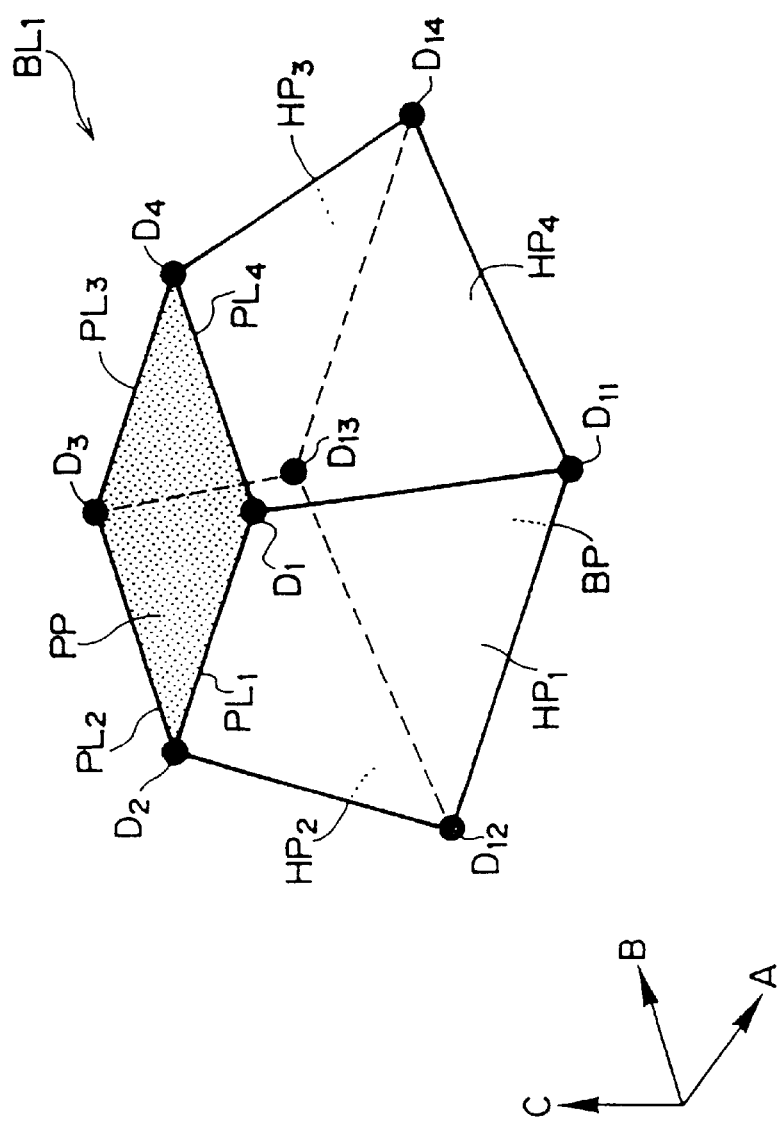
FIG. 6 is a diagram showing a basic shape model of one block among a pitch group.

FIG. 6 shows one example of a basic shape model of one block $BL_1$ of the pitch group $PT_1$. One block can be determined by eight points $D_1, D_2, D_3, D_4, D_{11}, D_{12}, D_{13}$ and $D_{14}$. In FIG. 6, arrow A indicates a tire circumferential direction, arrow B indicates a tire widthwise direction and arrow C indicates a tire radial direction. Further, PP indicates a ground-contact surface of the one block, $PL_1, PL_2, PL_3$ and $PL_4$ indicate lines expressing the ground-contact surface shape, and $D_1, D_2, D_3$ and $D_4$ indicate vertices of the ground-contact surface which are points of intersection of the lines expressing the ground-contact surface shape. In this model, since the ground-contact surface PP is square, wall surfaces $HP_1, HP_2, HP_3$ and $HP_4$ are connected to the ground-contact surface PP. A bottom surface BP is formed substantially parallel to the ground-contact surface PP, and bottom points $D_{11}, D_{12}, D_{13}$ and $D_{14}$ are formed by the wall surfaces and the bottom surface.

It is also possible for the distance between the wall surface and the bottom surface to correspond to the so-called groove depth. The basic shape model can be divided into a plurality of elements, and may be divided into a plurality of elements by a plurality of normal lines of the tire surface, and may be divided into arbitrary shapes such as triangles depending upon the purpose of design.

Because the basic shape model of one block $BL_3$ of the pitch group $PT_3$ is the same as the above described block $BL_1$, detailed description thereof will be omitted, and corresponding reference symbols will be described. In the block $BL_3$, points $D_5, D_6, D_7, D_8, D_{51}, D_{62}, D_{73}$ and $D_{84}$ are set in correspondence to the eight points $D_1, D_2, D_3, D_4, D_{11}, D_{12}, D_{13}$ and $D_{14}$ of the block $BL_1$. The block $BL_3$ includes lines $PL_5, PL_6, PL_7$ and $PL_8$ corresponding to the lines $PL_1, PL_2, PL_3$ and $PL_4$ expressing the ground-contact surface shape of the block $BL_1$. The block $BL_3$ includes vertices $D_5, D_6, D_7, D_8$ corresponding to vertices $D_1, D_2, D_3$ and $D_4$ of the ground-contact surface of the block $BL_1$. Wall surfaces $HP_5, HP_6, HP_7$ and $HP_8$ are connected to the ground-contact surface of the block $BL_3$, in correspondence to the wall surfaces $HP_1, HP_2, HP_3$ and $HP_4$ connected to the ground-contact surface of the block $BL_1$. Bottom points $D_{51}, D_{62}, D_{73}$ and $D_{84}$ are formed in correspondence to the bottom points $D_{11}, D_{12}, D_{13}$ and $D_{14}$ formed by the wall surfaces and the bottom surface of the block $BL_1$.

In next step 102, an objective function representing a physical amount for evaluating a performance of the tire, a constraint condition for limiting the tire shape, and a design variable which determines block shapes, i.e., which determines block shapes of blocks which are elements of the respective pitch groups, are determined. In the present embodiment, in order to enhance the steering stability and the irregular wear resistance, the objective function OBJ and the constraint condition G are determined as follows:

objective function OBJ: Differences among the block rigidities are made uniform.

Constraint condition G: Tread thickness limiting the tire shape is made uniform.

The difference among the block rigidities which is set as the objective function OBJ can be obtained by determining positions of the blocks $BL_1$ and $BL_3$ provided on the tire for each of the pitch groups $PT_1$ and $PT_3$ and determining for each block the rigidity for each predetermined angle from the rigidity in the tire circumferential direction to the rigidity in the tire widthwise direction by using known equations of rigidity, so as to calculate the difference among the block rigidities by using a value of the difference of the rigidities between the blocks of the pitch groups $PT_1$, $PT_3$ and the dispersion of the differences, e.g., an average value and the deviation. Therefore, the difference in distributions of rigidities or the difference in rigidities between the pitch groups $PT_1$ and $PT_3$, in which the adjacent pitches are the same, on the pitch array are obtained. By determining in advance a range of directions or an angle difference value for obtaining the rigidities, it is possible to design a block having directivity with respect to block rigidity.

The tread thickness which is set as the constraint condition G can be obtained from the volume except the volume required by the blocks $BL_1$ and $BL_3$, i.e., by the volume of the grooves, at the time of forming a tire having the blocks $BL_1$ and $BL_3$ provided on the tire. That is, the flow amount of the material such as rubber in a radial direction of tire is determined in accordance with the volume of the grooves, and the tread thickness can be estimated from this value.

Figure 5:
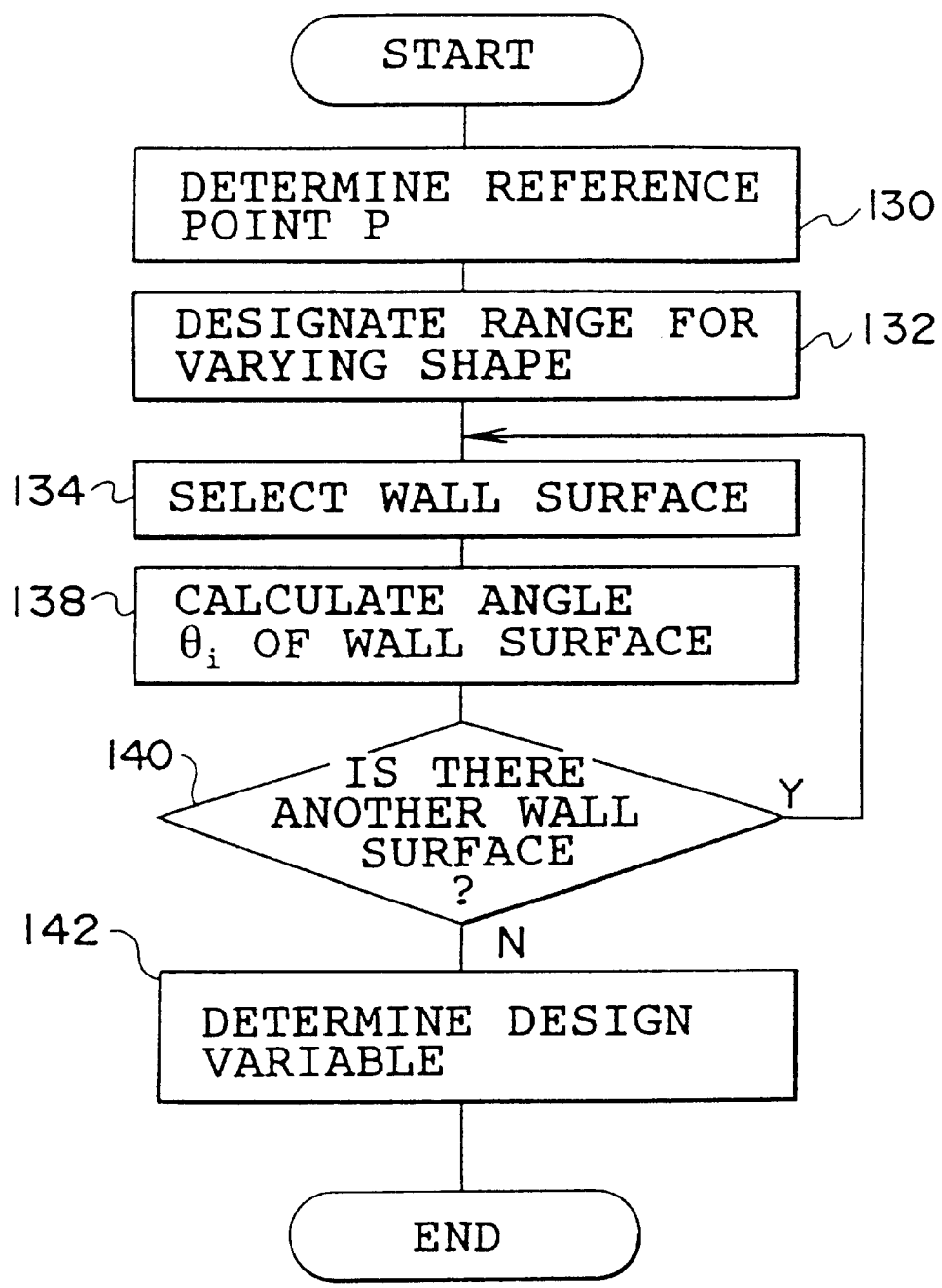
FIG. 5 is a flowchart showing a flow of an angle calculating routine for determining a design variable.
Figure 7:
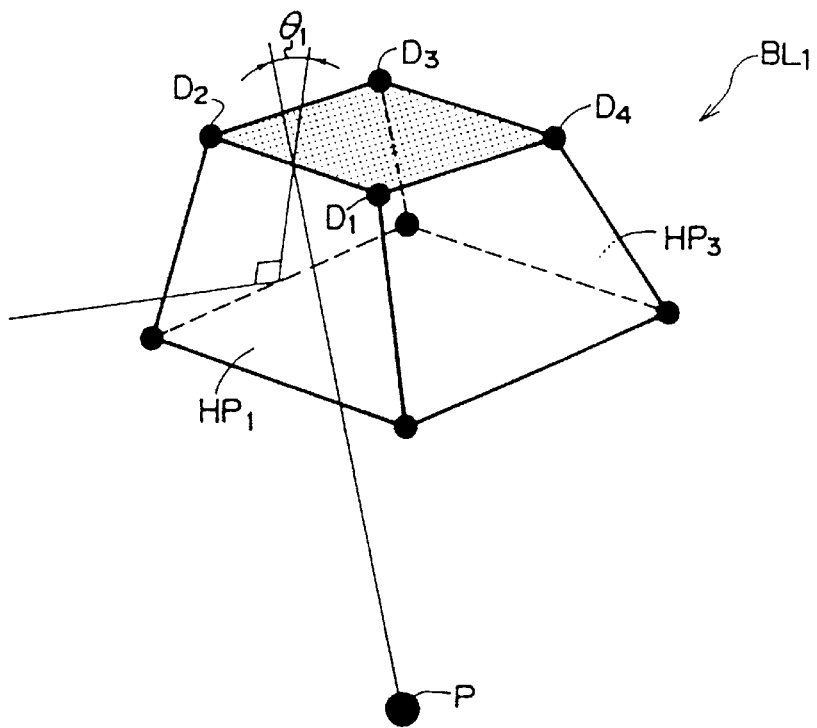
FIG. 7 is a diagram for explaining a wall surface angle.
Figure 8:
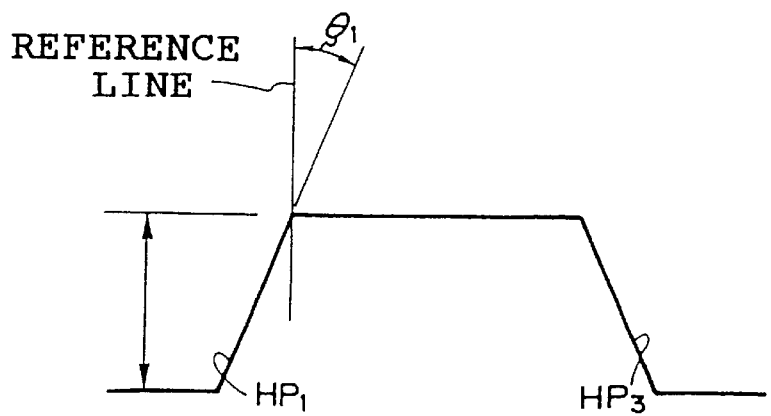
FIG. 8 is a sectional view of FIG. 7.

Further, in the present embodiment, the wall surface angle is used as the design variable and is set by the angle calculating routine shown in FIG. 5. In step 130 of this angle calculating routine, a reference point P is set at a predetermined point (the center point of the tire, for example) inside of the tire as shown in FIG. 7. In next step 132, a range in which it is possible to incline the wall surface of the block is designated as a range which varies the block shape. In step 134, a wall surface of the block is selected by selecting, from the vertices of the ground-contact surface, one group of points which are adjacent to each other. In the example shown in FIG. 7, the wall surface $HP_1$ is selected by selecting the points $D_1$ and $D_2$ of the block $BL_1$ in the pitch group $PT_1$. In next step 138, a ridge line of the selected wall surface (in the example shown in FIG. 7, a straight line passing through the line $PL_1$ from the reference point P), i.e., a straight line in the tire radial direction, is set as a reference line, and an angle $\theta_1$ defined between the reference line and the selected wall surface $HP_1$ is calculated as shown in FIGS. 7 and 8.

In next step 140, a determination is made as to whether there exists a remaining group of adjacent points from the vertices of the ground-contact surface, so as to determine whether there exists another wall surface. If there exists another wall surface, i.e., if the determination in step 140 is affirmative, the procedure is returned to step 134, and the above process is repeated. In this way, angles $\theta_1, \theta_2, \theta_3, \ldots$ (which will be indicated hereinafter in general as $\theta_i$, wherein i=1, 2, ... the maximum number of wall surfaces) for each of the wall surfaces are calculated. When the angles $\theta_i$ have been calculated for all of the wall surfaces (when the determination in step 140 is negative), the wall surface angles $\theta_i$ are set as the design variables $r_i$ in next step 142.

After the objective function OBJ, the constraint condition G and the design variables $r_i$ have been determined in this manner, an initial value OBJO of the objective function OBJ and an initial value Go of the constraint condition G at an initial values ro of the design variables $r_i$ are calculated in step 104 in FIG. 4.

Next, in step 106 in FIG. 4, the design variables $r_i$ are each continuously varied by $^\Delta r_i$ in order to vary the basic shape model. When the design variables $r_i$ are varied, all of the design variables $r_i$ may be varied simultaneously, or one of the design variables $r_i$ may be varied, or a plurality of design variables among all of the design variables $r_i$ may be varied by $^\Delta r_i$ simultaneously. In next step 108, a shape of each of the blocks formed by angles of the wall surfaces which have been varied by $\Delta r_i$ are determined, i.e., coordinates of each of points $D_1$, $D_2$, $D_3$, $D_4$, $D_{11}$, $D_{12}$, $D_{13}$, $D_{14}$ and points $D_5$, $D_6$, $D_7$, $D_8$, $D_{51}$, $D_{62}$, $D_{73}$, $D_{84}$ which have been varied by varying the angle of the wall surface are determined. In this way, each of block shapes after the design variable has been varied by $^\Delta r_i$, i.e., each modified shape model, is determined.

In step 110, a value $OBJ_i$ of the objective function and a value $G_i$ of the constraint condition, after the design variable has been varied by $^\Delta r_i$ with respect to the modified shape model determined in step 108, are calculated. In step 112, a sensitivity $dOBJ/dr_i$ of the objective function, which is a ratio of the variation amount of the objective function to the unit variation amount of the design variable, and a sensitivity $dG/dr_i$ of the constraint condition, which is a ratio of the variation amount of the constraint condition to the unit variation amount of the design variable, are calculated for every design variable, in accordance with the following equations:

$$dOBJ/dr_i=(OBJ_i-OBJo)/^\Delta r_i dG/dr_i=(G_i-Go)/dr_i \quad (3)$$

By these sensitivities, it is possible to estimate to what extent the value of the objective function and the value of the constraint condition will vary when the design variable is varied by $^\Delta r_i$. These sensitivities may be obtained analytically depending upon the techniques used for modeling the tire or properties of the design variable. In such a case, the calculation in step 110 is unnecessary.

In next step 114, using the initial value OBJo of the objective function, the initial value Go of the constraint condition, the initial value ro of the design variable, and the sensitivities, there is estimated by mathematical programming a variation amount of the design variable which minimizes the objective function i.e., minimizes the difference among the block rigidities, while satisfying the constraint condition. Using the estimated value of the design variable, the modified shape models are determined in step 115 by using the same method as that of step 108, and the objective function value is calculated. In step 116, the difference between the objective function value OBJ calculated in step 115 and the initial value OBJo of the objective function calculated in step 104, and a threshold value which has been previously input are compared with each other to determine whether the value of the objective function converges. If the value of the objective function does not converge, steps 104 to 116 are repeated while taking the design variable obtained in step 114 as the initial value. When it is determined that the value of the objective function has converged, the value of the design variable at that time is determined as the value of the design variable which minimizes the objective function while satisfying the constraint condition, and in step 120, the block shapes forming each pitch of each pitch group are determined by using this design variable value. With these procedures, the shapes of the two pitch groups forming a portion of the tire are determined.

Figure 9:
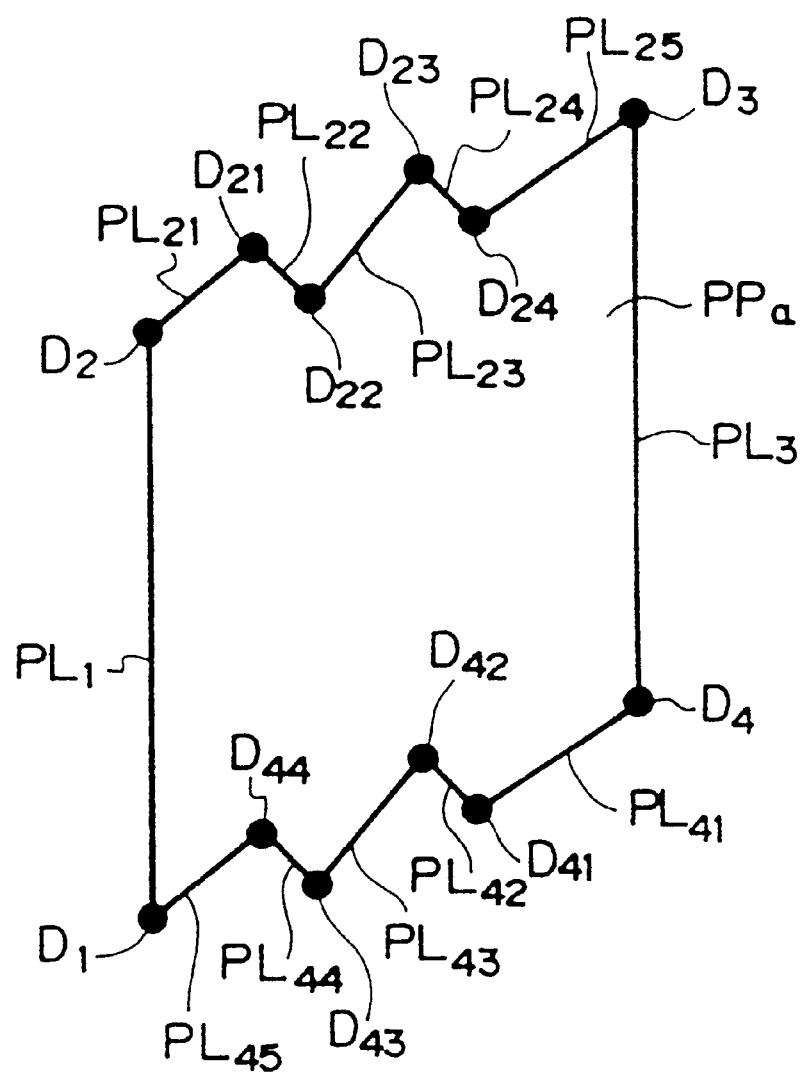
FIG. 9 is a diagram for showing a shape of a ground-contact surface for explaining design variables of a number of wall surfaces.

Although a case in which one block has four wall surfaces is described in the present embodiment, the present invention can also be applied to a block formed with a large number of wall surfaces. Such a block formed with a large number of wall surfaces can be considered to have a ground-contact surface having a plurality of lines representing a ground-contact surface shape formed as a polygon. For example, as shown in FIG. 9, a ground-contact surface PPa of one block has four basic points $D_1$, $D_2$, $D_3$ and $D_4$. Between the points $D_2$ and $D_3$, points $D_{21}$, $D_{22}$, $D_{23}$ and $D_{24}$ are formed, and lines $PL_{21}$, $PL_{22}$, $PL_{23}$, $PL_{24}$ and $PL_{25}$ are formed instead of the line $PL_2$ connecting the points $D_2$ and $D_3$ (FIG. 6). Similarly, points $D_{41}$, $D_{42}$, $D_{43}$ and $D_{44}$ are formed between the points $D_1$ and $D_4$, and lines $PL_{41}$, $PL_{42}$, $PL_{43}$, $PL_{44}$ and $PL_{45}$ are formed instead of the line $PL_4$. Therefore, wall surfaces $HP_1$, $HP_{21}$, $HP_{22}$, $HP_{23}$, $HP_{24}$, $HP_{25}$, $HP_3$, $HP_{41}$, $HP_{42}$, $HP_{43}$, $HP_{44}$, $HP_{45}$ which are continuous from the lines are connected to the ground-contact surface PPa. At least one of these wall surfaces $HP_1$ to $HP_{45}$ can be used as a design variable.

Figure 10:
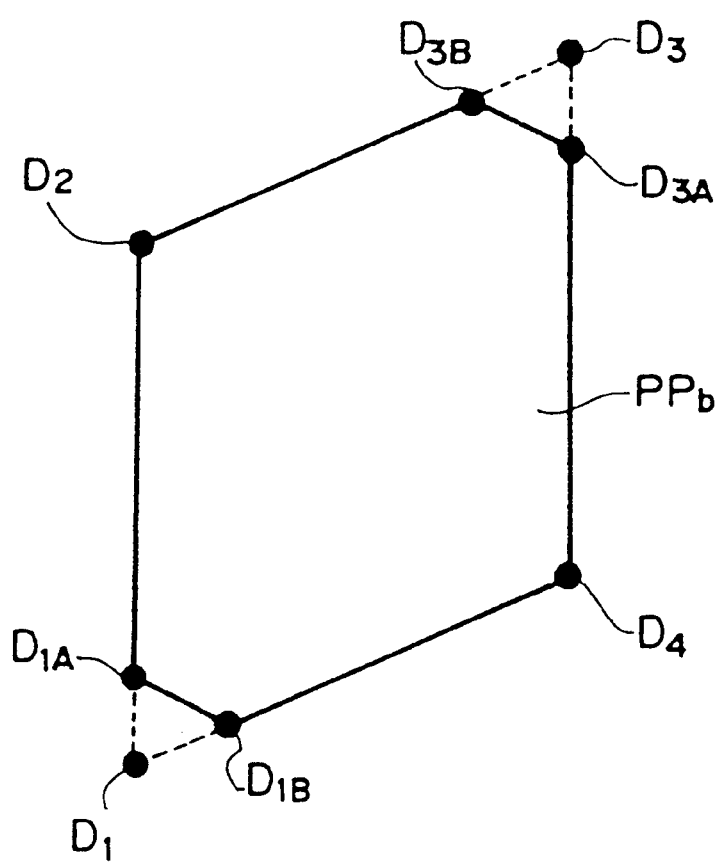
FIG. 10 is a diagram for showing a shape of a ground-contact surface of a chamfered block.

Further, as shown in FIG. 10, it is easy to apply the present invention to a block shape from which an angle of one block is cut by a predetermined amount, i.e., a so-called chamfered block shape. FIG. 10 shows a case in which a ground-contact surface PPb of one block has four basic points $D_1$, $D_2$, $D_3$ and $D_4$, and the point $D_1$ side and the point $D_4$ side are chamfered. It is possible to determine the chamfering amount by determining the coordinates of points $D_{1A}$ and $D_{1B}$, which are to be formed by cutting the angle at the point $D_1$ side of the block, and the coordinates of points $D_{3A}$ and $D_{3B}$, which are to be formed by cutting the angle at the point $D_4$ side of the block. Therefore, if the chamfering amount is determined in advance, the positions, i.e., the points to be chamfered can be determined, and at least one of the wall surfaces including a wall surface to be formed by chamfering can be used as a design variable.

Figure 11:
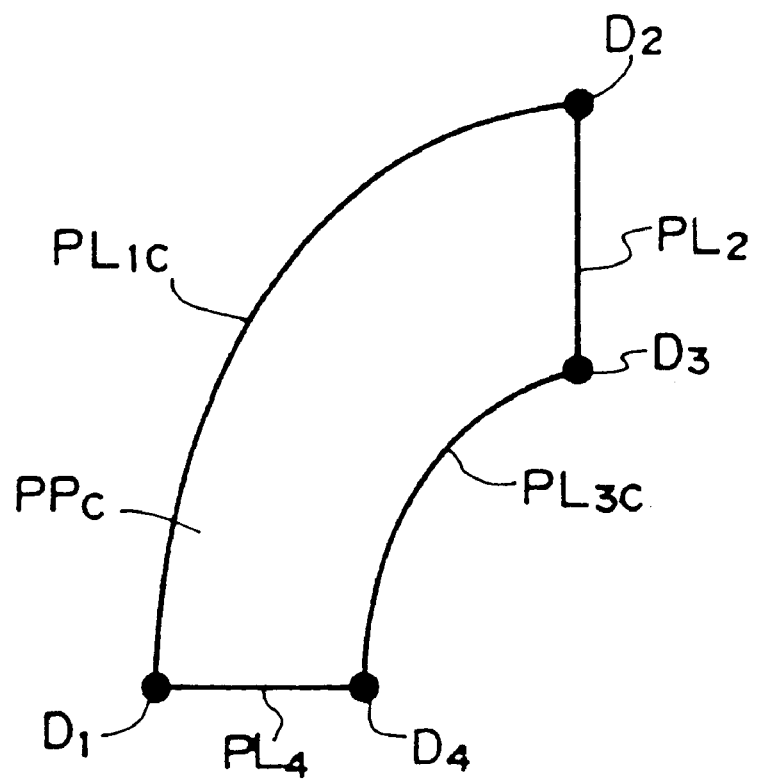
FIG. 11 is a diagram for showing a shape of a ground-contact surface of a tire having a curved wall surface.
Figure 12:
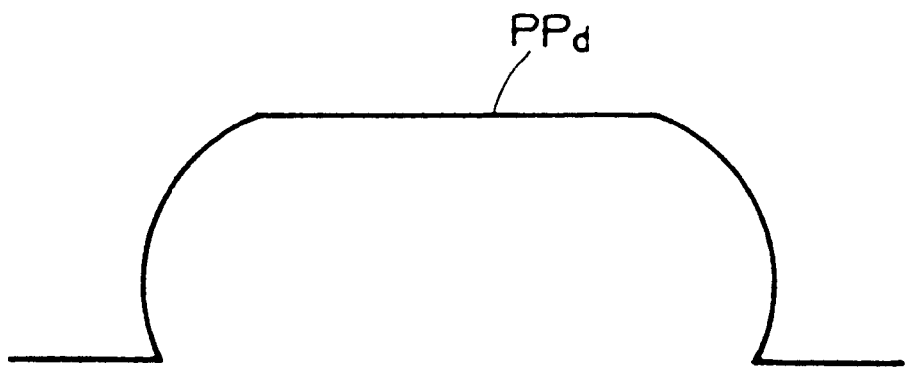
FIG. 12 is a diagram for showing a cross-sectional configuration of a block having a wall surface which is curved in a direction different from that of FIG. 11.

Although a case in which the line forming the wall surface of the block is a straight line is described above, the line is not be limited to a straight line only, and the line may be a curved line represented by a predetermined function as shown in FIG. 11. In the example shown in FIG. 11, the ground-contact surface PPc of one block has four points $D_1$, $D_2$, $D_3$ and $D_4$. A line $PL_{1c}$ connecting the points $D_1$ and $D_2$ is represented by a predetermined function (e.g., a multidimensional curved line or hyperbola), and a line $PL_{3c}$ connecting the points $D_3$ and $D_4$ is also represented by a predetermined function (e.g., a multidimensional curved line or hyperbola). In this case, the curved line shapes of the lines $PL_{1c}$ and $PL_{3c}$ may be determined by Lagrangian interpolation, or the curved line itself may be varied as a design variable. Although a wall surface which is continuous from each line of the ground-contact surface PPc becomes a curved surface, one wall surface may be divided into fine regions (fine planes), and the wall surface may be determined using Lagrangian interpolation or the like. Further, the shape of the wall surface itself which is continuous from the ground-contact surface PPd may be a curved surface as shown in FIG. 12.

The rigidities of a single block in the two pitch group can be made unifrom in this manner. Therefore, shapes of lug grooves, shapes of rib grooves and the like of the tire can be made appropriately, and shapes at positions in the widthwise direction of a tire can be made appropriately and high level irregular wear resistance and running performance can both be established, in accordance with required performances and the frequency of use during cornering and straight running, without being influenced by the block shape at the ground-contact surface of the tire tread portion.

Figure 13:
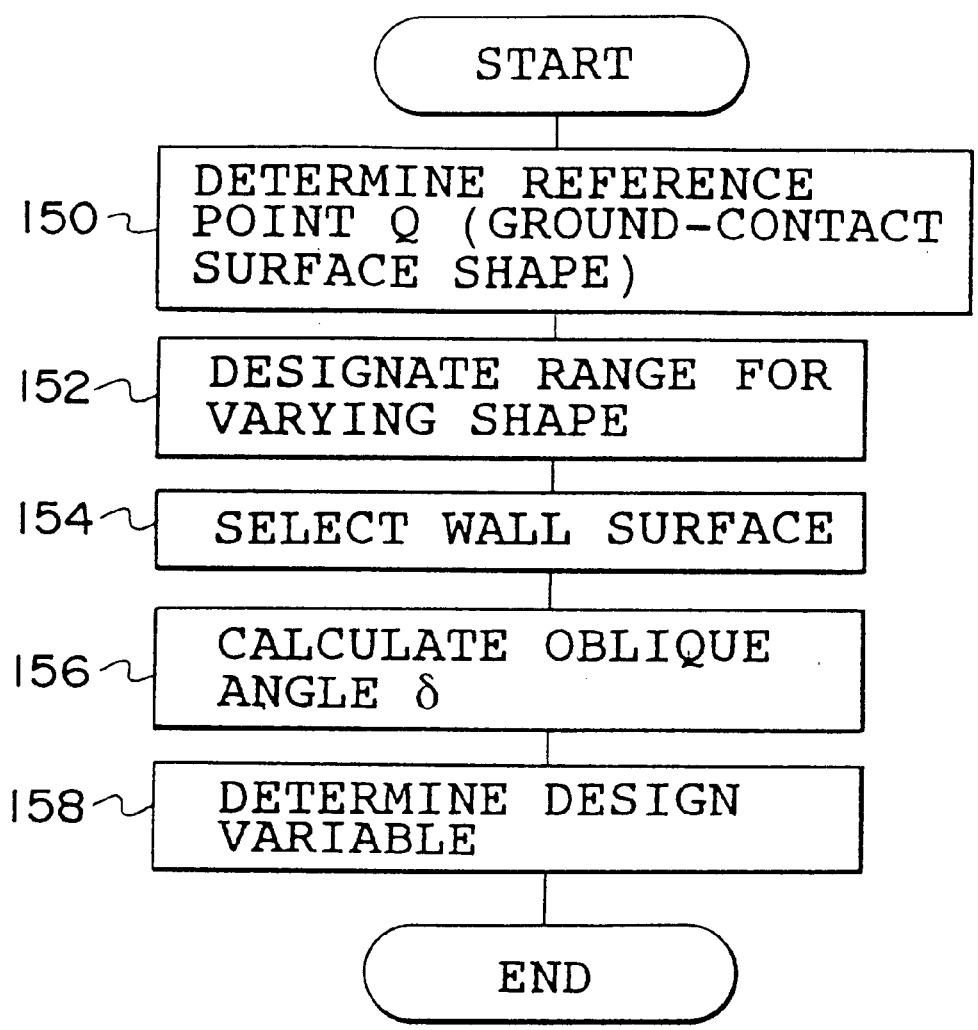
FIG. 13 is a flowchart showing a flow of other processes for determining a design variable.
Figure 14:
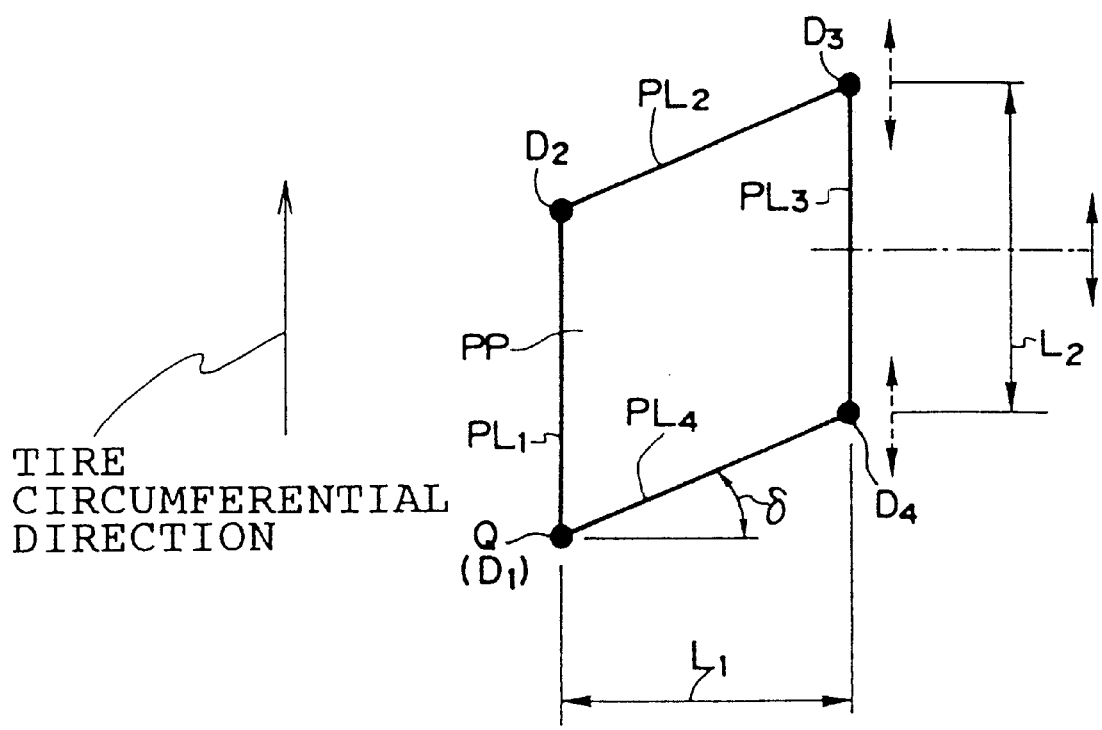
FIG. 14 is a view for explaining another example of a design variable.

As the above-described design variable, an oblique angle can be employed. The setting of this design variable is conducted by carrying out the oblique angle calculating routine shown in FIG.13 in place of the processing in FIG. 5. In step 150 of the oblique angle calculating routine, a reference point Q is set at a predetermined point (at vertex $D_1$ in the example shown in FIG. 14) of the ground-contact surface of the tire as shown in FIG. 14. In next step 152, a range in which the line of the ground-contact surface of the block can be inclined is designated as a range in which the block shape (ground-contact surface shape) is varied. In step 154, a wall surface of the block is selected by selecting a point for inclining the line among points which are adjacent to the designated vertex of the ground-contact surface. In the example shown in FIG. 14, the line $PL_4$ which is continuous with the wall surface $HP_4$ is selected by selecting the point $D_4$. In order to maintain opposing lines of the block shape parallel, it is preferable to also select the corresponding line $PL_2$ when the line $PL_4$ is selected. In next step 156, an angle $\delta$ defined between the selected line $PL_4$ and a reference line (a straight line parallel to the widthwise direction of the tire) is calculated. This angle $\delta$ is the oblique angle. In next step 158, coordinates of the points $D_3$ and $D_4$ defining the lines $PL_2$ and $PL_4$ are obtained as variables for varying the oblique angle. Since a length $L_1$ in the tire widthwise direction and a length $L_2$ in the tire circumferential direction of this ground-contact surface shape are previously determined, the oblique angle $\delta$ must be varied without varying these lengths. To this end, the points $D_3$ and $D_4$ may be moved in the tire circumferential direction. The amount of movement $S_i$ is set as the design variable $r_i$.

Figure 15:
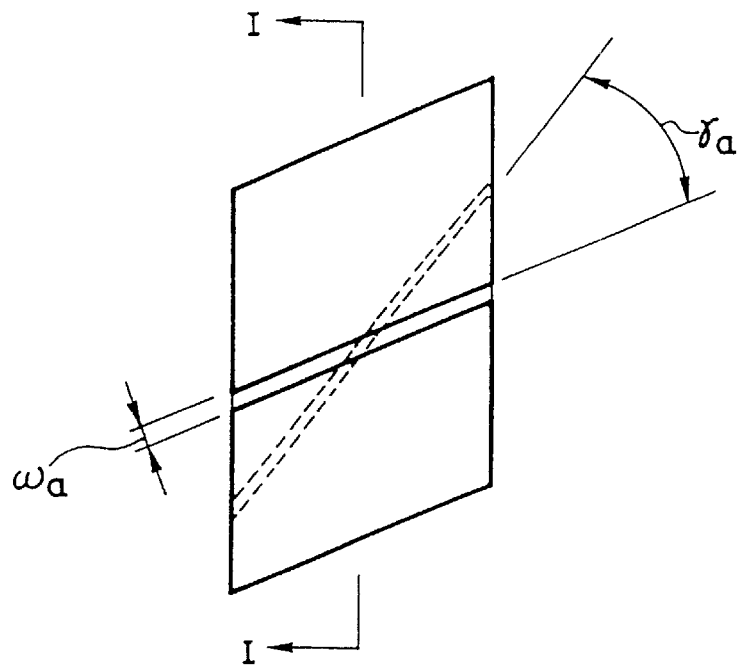
FIG. 15 is a diagram showing a shape of a sipe formed in the block.
Figure 16:
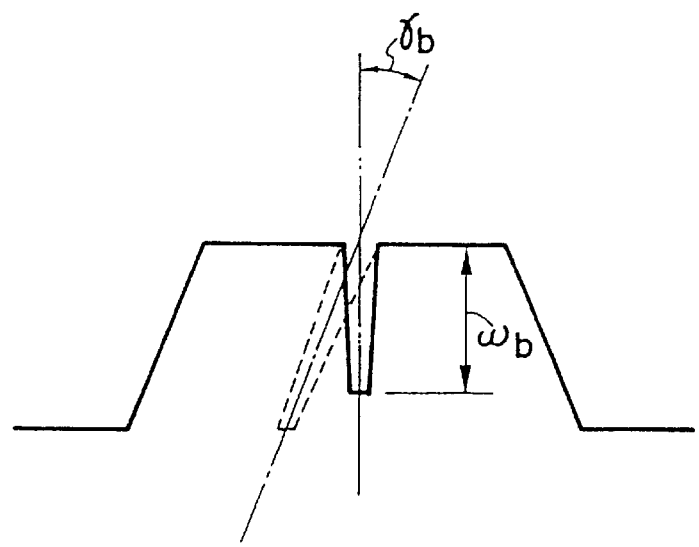
FIG. 16 is a sectional view taken along the line I—I in FIG. 15.
Figure 17:
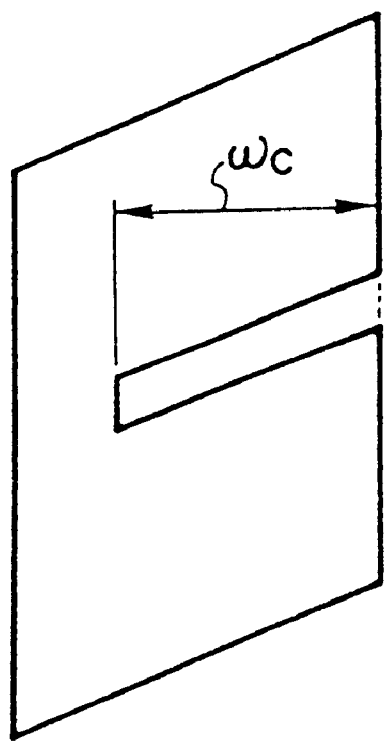
FIG. 17 is a diagram showing a length of a sipe formed midway into the block.

Another example of the design variable is the number of sipes formed in the block. As shown in FIG. 15, a sipe has a width wa and an inclination γa. Further, as shown in FIG. 16, a sipe has a depth wb and inclination γb within the block. Further, the sipe need not pass through the block, and as shown in FIG. 17, a sipe has a length wc when the sipe is formed midway into a block.

When the optimization for the two pitch groups has been completed, in step 310 in FIG.3, it is determined whether the above-described processing has been completed for all of the pitch groups in the pitch array V. When there exists a remaining pitch group, steps 306 to 310 are repeated.

When the optimization for all of the pitch groups in the pitch array V has been completed, the procedure is advanced to step 312, the block shape forming each pitch in each pitch group is determined, and the block shapes of all the pitch groups forming the tire are determined, so as to determine the tire shape.

In this manner, since the differences between rigidities for each of the pitch groups can be made uniform, shapes of lug grooves, shapes of rib grooves and the like of the tire can be made appropriately and a shape at a position in widthwise direction of a tire can be made appropriately, without being influenced by the magnitude of the pitch of the pitch array formed at the tire tread portion. Uneven wear resistance and running performance can both be established at high levels.

Second Embodiment

Next, a second embodiment will be described. In the above-described embodiment, differences between rigidities of two pitch groups are made uniform. However, in a case in which there are many pitch groups, the values of the block rigidities to be uniformized may vary widely. For this reason, in the present embodiment, the differences between rigidities are stably uniformized. Since the present embodiment is structured substantially the same as the above-described embodiment, the same elements are denoted by the same reference symbols, and their detailed descriptions will be omitted.

Figure 18:
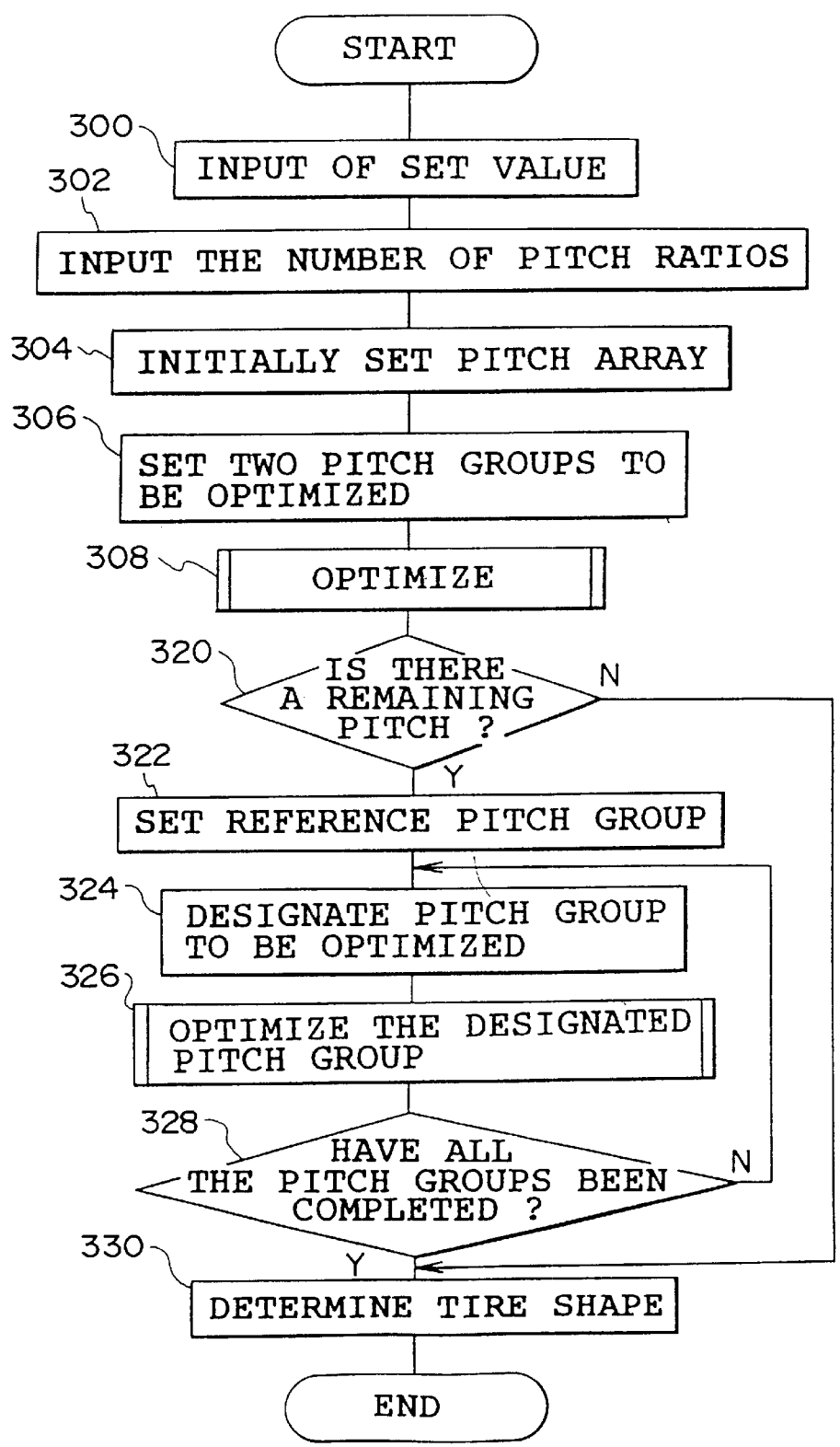
FIG. 18 is a flow chart showing a flow of a tire shape design processing routine according to a second embodiment of the present invention.

As shown in FIG.18, when the optimization of two pitch groups has been completed in the same way as in the above-described embodiment, in step 320, it is determined whether the above-described process has been completed for all of the pitch groups in the pitch array V. When there exists remaining pitch group(s), in step 322, either one of the optimized two pitch groups is set as a reference pitch group. In next step 324, any one of the remaining pitch groups is designated as an optimization pitch group, and the designated optimization pitch group is optimized in next step 326. In this step 326, only the optimization pitch group is varied for optimization without varying the design variable of the reference pitch group (FIG. 4).

When the optimization pitch group has been optimized, in next step 328, it is determined whether optimization has been completed for all of the pitch groups in the pitch array V. When there exists remaining pitch group(s), steps 324 to 328 are repeated. When the optimization for all of the pitch groups in the pitch array V has been completed, the procedure is advanced to step 330, the block shape forming each pitch in each pitch group is determined, and the block shapes of all the pitch groups forming the tire are determined, so as to thereby determine the tire shape.

In this manner, since the differences between rigidities for all of the pitch groups can be uniformized, the shapes of lug grooves, the shapes of the rib grooves and the like of the tire can be made appropriately and appropriateness in the widthwise direction of the tire can be acheived, without being influenced by the magnitude of the pitch of the pitch array formed in the tire tread portion and without varying the values of rigidities of the blocks. Wear resistance and running performance of the tire can be established at high levels.

In each of the above embodiments, although two pitch groups are designated and the differences in the rigidities are made uniform, the values of the block rigidities to be uniformized may vary widely. Therefore, differences in rigidities may be uniformized stably. For example, an arbitrary pitch group may be determined as a reference pitch group of the tire 20, and the other pitch group may be optimized so as to uniformize the differences in rigidity with respect to the reference pitch group. In this case, as the arbitrary pitch group, a pitch group which is obtained by data determined previously by experimentation may be used. Alternately, the block rigidities may be determined in advance, and at these block rigidities, differences in the rigidities of the two pitch groups may be made uniform.

Third Embodiment

Next, a third embodiment will be described. The present embodiment is to design the block shape of a tire by a genetic algorithm. A design variable which is different from the above-described embodiments may be used. Since the present embodiment is structured substantially the same as the above-described embodiments, the same elements are denoted by the same reference symbols, and their detailed descriptions will be omitted.

Figure 19:
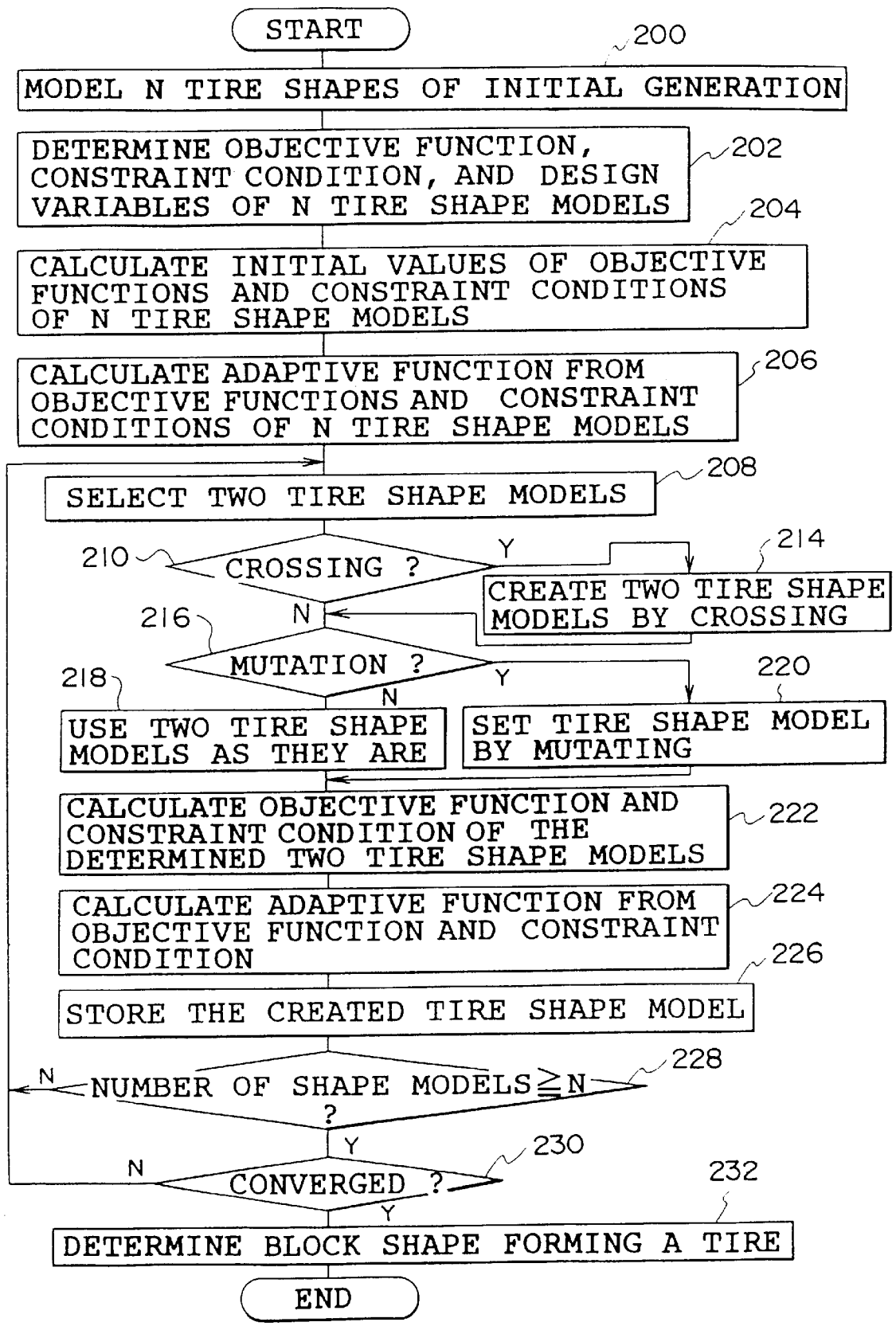
FIG. 19 is a flowchart showing a flow of a tire shape design processing routine according to a third embodiment of the present invention.

FIG. 19 shows a processing routine of a program of the present embodiment. In step 200, each of the block shapes of a plurality of pitch groups included in the pitch array V is modeled into N block shapes by a technique which can numerically and analytically obtain the block rigidity of the tire such as the finite element method, to thereby obtain a tire basic shape model including an internal structure. N is previously input by a user. One block shape model of the tire basic shape model used in the present embodiment is the same as that shown in FIG. 6 of the first embodiment.

In next step 202, an objective function representing a physical amount for evaluating performance of the tire, a constraint condition for limiting the tire shape, and a design variable for determining each of the block shapes of N tire shape models are determined. In the present embodiment, in order to enhance the steering stability and uneven wear resistance, the objective function OBJ and the constraint condition G are determined as follows.

Objective function OBJ: Differences in the block rigidities are made uniform.

Constraint condition G: Tread thicknesses constraining the tire shape are made uniform.

A wall surface angle which is the design variable is determined for each of the N tire shape models by the angle calculation routine in FIG. 5, as described in the first embodiment. Since this process is the same as that of the first embodiment, description thereof will be omitted.

After the objective function OBJ, the constraint condition G and each of the design variables $r_{iJ}$ (J=1, 2, ..., N) of the N tire shape models have been determined by repeating the angle calculation routine N times, in step 204 in FIG. 19, the objective function $OBJ_J$ and the constraint condition $G_J$ of each of the design variables $r_{iJ}$ of the N tire shape models are calculated.

In next step 206, by using the objective function $OBJ_J$ and the constraint condition $G_J$ of each of the N tire shape models obtained in step 204, an adaptive function $F_J$ of each of the N shape models is calculated in accordance with the following equation (4). In the present embodiment, for example, in order to uniformize the block rigidities, the value of the adaptive function (fitness) increases as the difference in the block rigidities or the difference in the standard deviations of the block rigidity decreases.

$$\Phi_J = -OBJ_J + \gamma.\max(G_J, O)$$

$$F_J = -\Phi_J \quad (4)$$

or, $$F_J = 1/\Phi_J$$

or, $$F_J = -a.\Phi_J + b$$

wherein $a = \Phi_{avg}(c-1)/(\Phi_{avg} - \Phi_{min})$
$b = \Phi_{avg}(c - \Phi_{min})/(\Phi_{avg} - \Phi_{min})$ $$\Phi avg = \frac{\sum_{J=1}^{N} \Phi J}{N}$$

c: constant
γ: penalty coefficient
$\Phi_{min} = \min(\Phi_1, \Phi_2, \ldots \Phi_N)$
$\Phi_J$: penalty function (J=1, 2, 3, ... N) of J-th tire shape model of N tire shape models c and γ are previously input by a user.

In next step 208, two tire shape models for crossing are selected from the N tire shape models. A generally known fitness proportion strategy is used as the method of selection. The probability Pe that a certain model e will be selected from the N shape models is represented by the following equation:

$$Pe = Fe \bigg/ \sum_{J=1}^{N} Fj$$

wherein
Fe: adaptive function of a certain model e among the N tire shape models
$F_J$: J-th adaptive function of the N tire shape models
J=1, 2, 3, ... N Although the fitness proportion strategy is used as the selecting method in the present embodiment, other strategies may be used such as expected value strategy, rank strategy, elite conservation strategy, tournament selection strategy, GENITOR algorithm and the like, as set forth in "Genetic Algorithm" edited by Hiroaki Kitano.

In next step 210, it is determined whether the selected two tire shape models should be crossed by the probability T which is input in advance by the user. Here, "cross" means that portions of elements of the two tire shape models are exchanged, as will be described later. If the determination is negative, i.e., if the selected two tire shape models should not be crossed, the routine proceeds as is to step 216. On the other hand, if the determination is affirmative, i.e., if the selected two tire shape models should be crossed, the two tire shape models are crossed in step 214 as will be described later.

Figure 20:
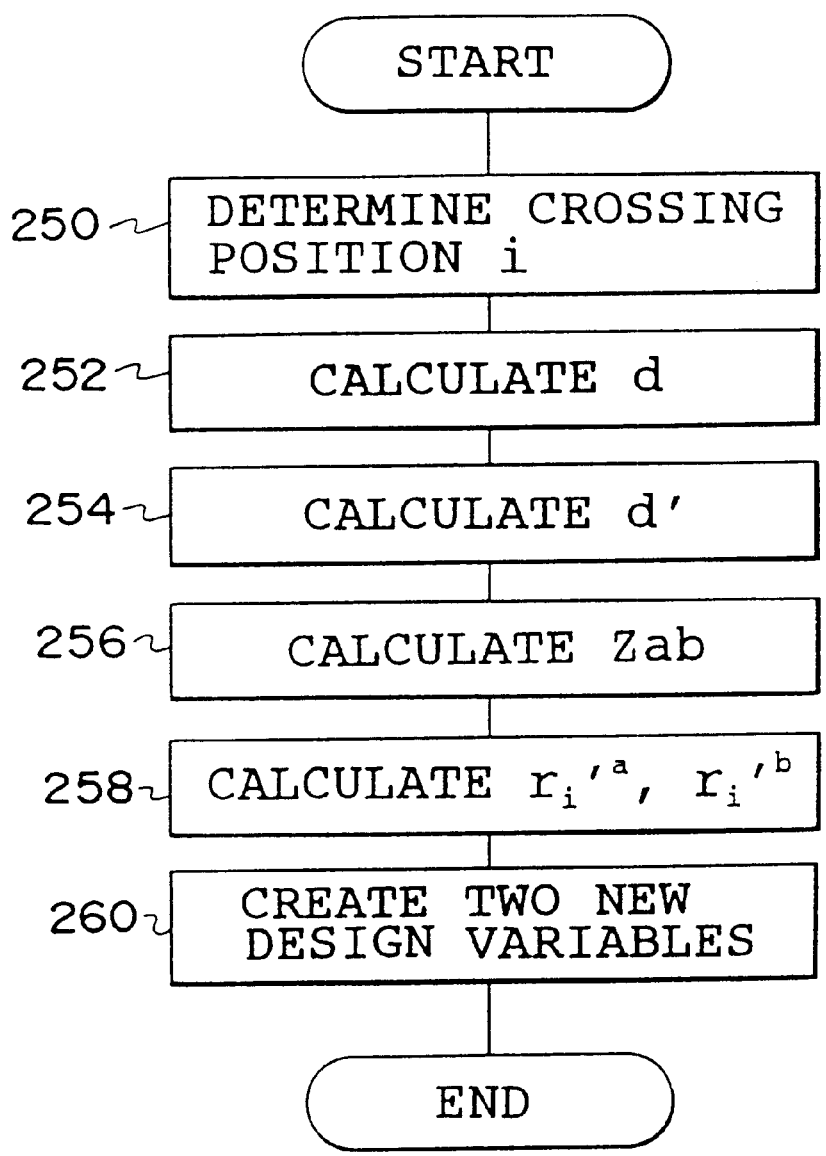
FIG. 20 is a flowchart showing a flow of a crossing process.

Crossing of the two tire shape models is carried out in accordance with the crossing routine shown in FIG. 20. First, in step 208, the selected two tire shape models are set to be a shape model a and a tire shape model b, the design variable of each of the tire shape models a, b is represented by a design variable vector including a row, the design variable vector of the tire shape model a is represented by $Vr^a = (r_1^a, r_2^a, \ldots r_i^a, \ldots, r_{n-1}^a)$, and the design variable vector of the shape model b is represented by $Vr^b = (r_1^b, r_2^b, \ldots, r_i^b, \ldots r_{n-1}^b)$. In step 250 in FIG. 20, previously determined random numbers are generated, and a crossing location i concerning the design variable vectors of the tire shape models a and b is determined in accordance with the random numbers.

In next step 252, with respect to the design variables $r_i^a$, $r_i^b$ of the tire shape models a and b which were determined to be crossed, a distance d is obtained in accordance with the following equation:

$$d = |r_i^a - r_i^b|$$

In next step 254, using the minimum value $B_L$ and the maximum value $B_U$ in the possible range of the $r_i^a$ and $r_i^b$, a normalized distance d' is obtained in accordance with the following equation:

$$d' = d/(B_U - B_L)$$

Figure 22A:
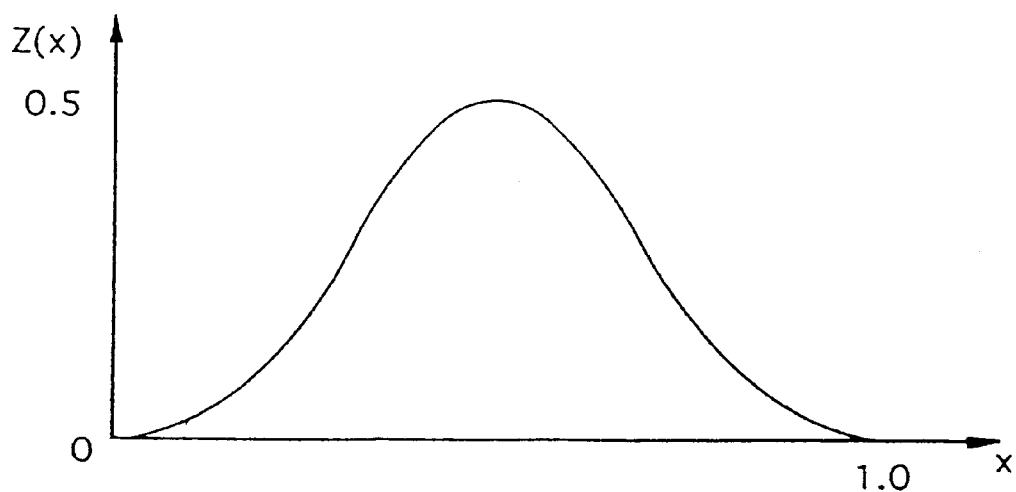
FIG. 22A is a diagram showing a continuous mountain shaped map function.
Figure 22B:
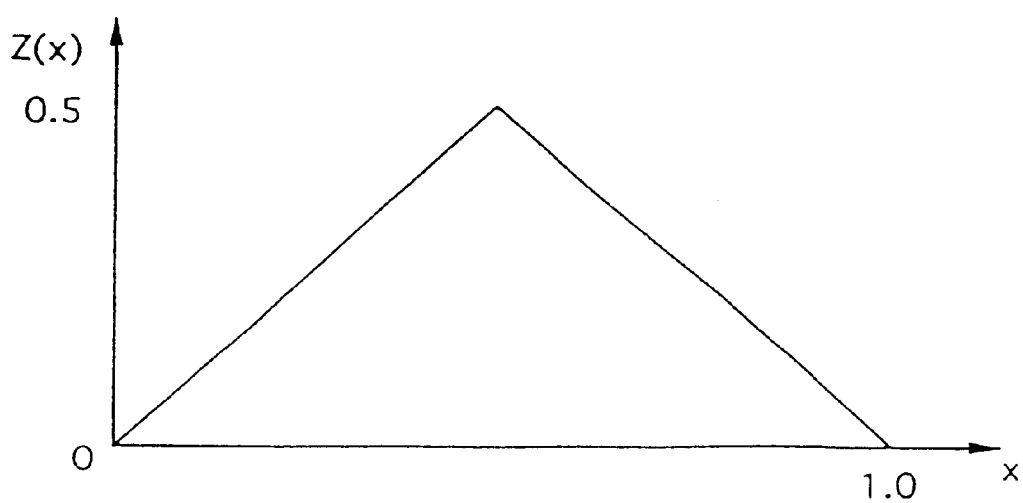
FIG. 22B is a diagram showing a linear mountain shaped map function.

In step 256, in order to disperse the values of the normalized distance d' to a proper degree, by using the mountain shaped map function Z(x) (0≦x≦1, 0≦Z(x)≦0.5) as shown in FIGS. 22A and 22B, function value $Z_{ab}$ is obtained in accordance with the following equation:

$$Z_{ab}=Z(d')$$

After the function value $Z_{ab}$ has been obtained in this manner, new design variables $r_i'^a$, $r_i'^b$ are obtained in step 258 in accordance with the following equations:

$$r_i'^a = r_i^a - \min(|r_i^a - B_L|, |r_i^a - B_U|)/0.5 \cdot Z_{ab}$$

$$r_i'^b = r_i^b + \min(|r_i^b - B_L|, |r_i^a - B_U|)/0.5 \cdot Z_{ab}$$

or, $$r_i'^a = r_i^a + \min(|r_i^a - B_L|, |r_i^a - B_U|)/0.5 \cdot Z_{ab}$$

$$r_i'^b = r_i^b - \min(|r_i^b - B_L|, |r_i^a - B_U|)/0.5 \cdot Z_{ab}$$

After the $r_i'^a$ and $r_i'^b$ have been obtained in this manner, in step 260, design variable vectors $Vr'^a$ and $Vr'^b$ which are rows of the new design variables are obtained as follows:

$$Vr'^a = (r_1^a, r_2^a, \ldots r_i'^a, r_{i+1}^b, \ldots, r_{n-1}^b)$$

$$Vr'^b = (r_1^b, r_2^b, \ldots r_i'^b, r_{i+1}^a, \ldots, r_{n-1}^a)$$

Figure 23A:
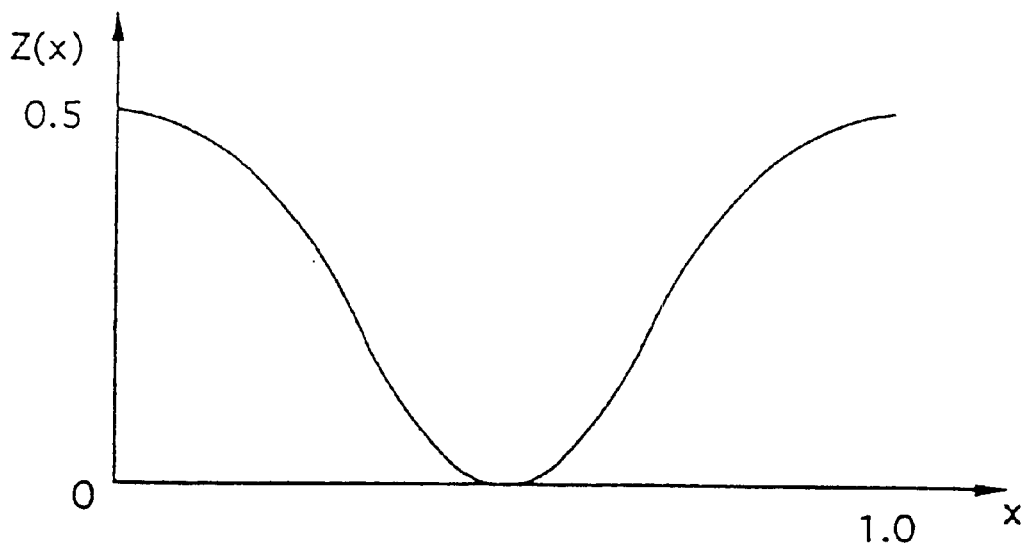
FIG. 23A is a diagram showing a continuous valley shaped map function.
Figure 23B:
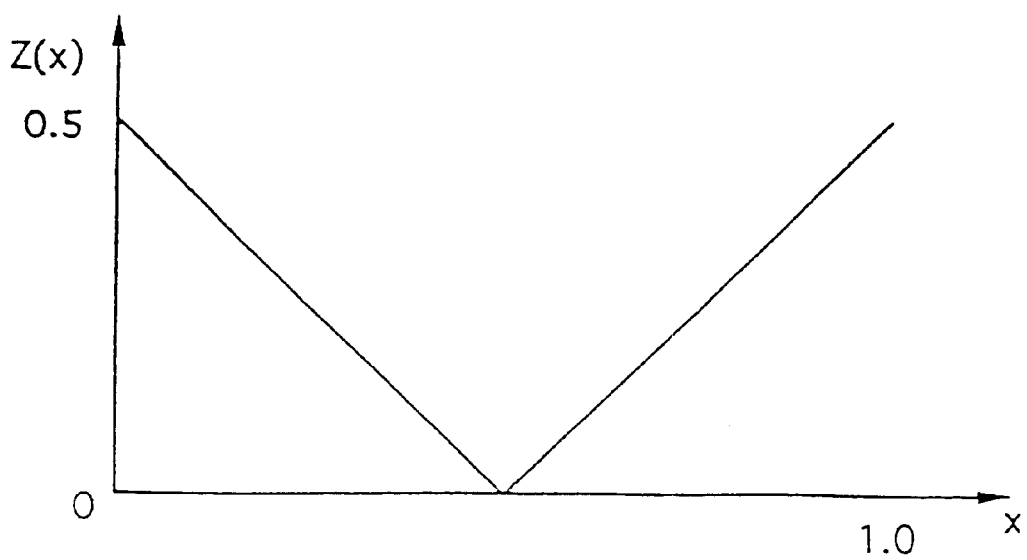
FIG. 23B is a diagram showing a linear valley shaped map function.

The minimum value $B_L$ and the maximum value $B_U$ in the possible range of $r_i$ are input in advance by the user. The map function $Z(x)$ may be a valley shaped function as shown in FIGS. 23A and 23B. In the above described example, there is one crossing location i, but a plurality of crossings or an even crossing may be used as set forth in "Genetic Algorithm" edited by Hiroaki Kitano.

After two new tire shape models have been created by such a crossing, in step 216 in FIG. 19, it is determined whether a mutation should be carried out at the probability S which is input in advance by the user. The term "mutation" means that a portion of the design variable is finely varied as will be described later, so as to increase the probability of including a population which can be an optimal design variable. If the determination in step 216 is negative, i.e., if no mutation is to be carried out, in step 226, the current two tire shape models are maintained as they are, and the procedure is advanced to next step 222. If the determination in step 216 is affirmative, i.e., if a mutation is to be carried out, a mutation is carried out in step 220 in the following manner.

Figure 21:
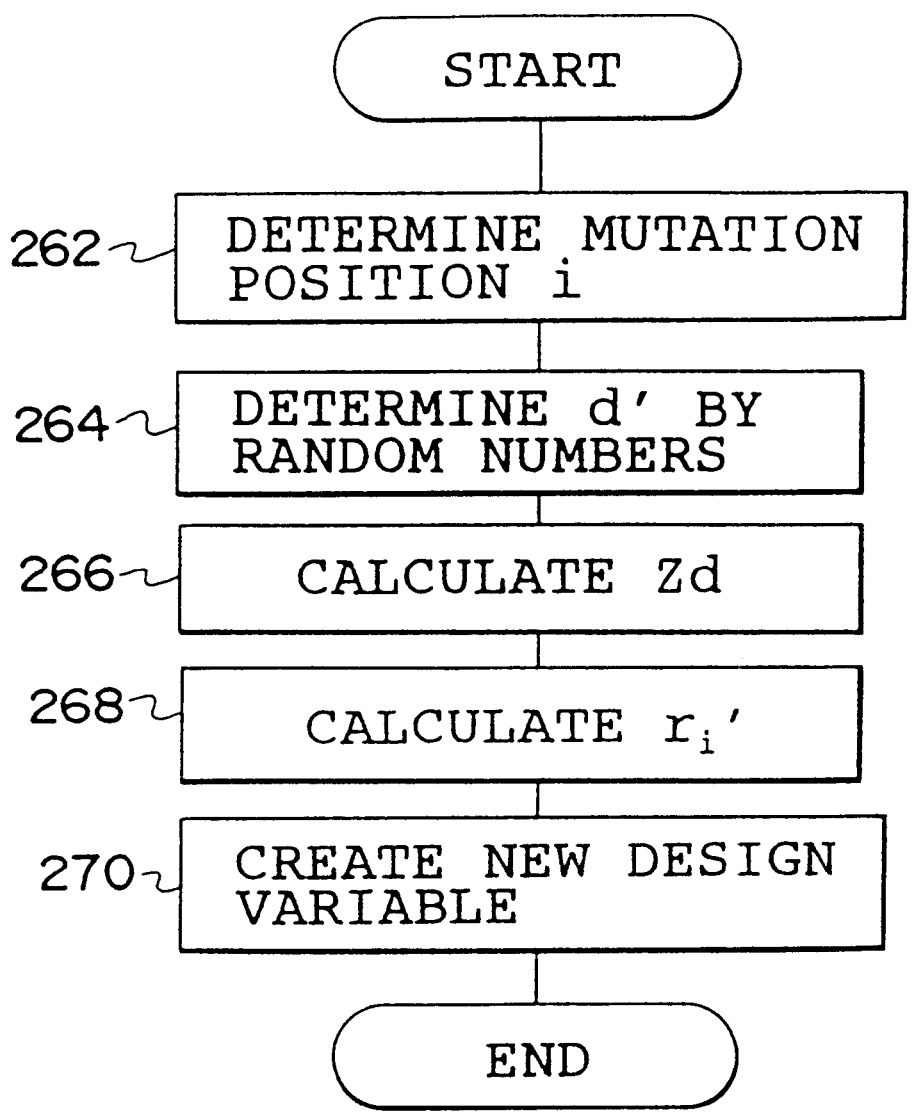
FIG. 21 is a flowchart showing a flow of a mutation process.

The mutation is carried out by the mutation routine shown in FIG. 21. First, random numbers are generated in step 262, and a location i for mutation is determined by the random numbers. In next step 264, a distance d' is determined by the random numbers within the following range:

$$0 \leq d' \leq 1$$

In next step 266, by using the mountain shaped map function $Z(x)$ ($0 \leq x \leq 1$, $0 \leq Z(x) \leq 0.5$) shown in FIGS. 22A and 22B, or by using the valley shaped map function $Z(x)$ shown in FIGS. 23A and 23B, a function value Zd is determined in accordance with the following equation:

$$Zd = Z(d')$$

After the function value Zd has been determined in this manner, a new design variable $r_i'$ is determined in step 268 in accordance with the following equations:

$$r_i' = r_i - \min(|r_i - B_L|, |r_i - B_U|)/0.5 \cdot Zd$$

or, $$r_i' = r_i + \min(|r_i - B_L|, |r_i - B_U|)/0.5 \cdot Zd$$

After the design variable $r_i'$ has been determined in this manner, a design variable vector $Vr'$ which is a row of the new design variables obtained in step 270 is as follows:

$$Vr' = (r_1, r_2, \ldots, r_i', r_{i+1}, \ldots, r_{n-1})$$

A value of the objective function and a value of the constraint condition are calculated in step 222 in FIG. 29 for the two tire shape models which have been newly created in this manner. In next step 224, an adaptive function is calculated by using equation (4) in the same manner as that in the previously-described embodiment, from the obtained value of the objective function and value of the constraint condition.

In next step 226, the two tire shape models are stored. In next step 228, it is determined whether the number of tire shape models stored in step 226 has reached N. If N has not been reached, steps 208 to 228 are repeated. On the other hand, if the number of tire shape models reaches N, a convergence judgement is made in step 230. If there is no convergence, N tire shape models are updated as the shape models stored in step 226, and steps 208 to 230 are repeated until N is reached. On the other hand, if it is determined in step 230 that there is convergence, the value of the design variable of the tire shape model having the maximum objective function value among the N tire shape models while substantially satisfying the constraint condition is used as the value of the design variable which maximizes the objective function while substantially satisfying the constraint condition. The tire shape is determined using this value of the design variable in step 232.

In the convergence judgement in step 230, if any one of the following constraint conditions is satisfied, it is determined that there is convergence.

1) The number of generations reaches a number M.
2) The number of line arrays having the greatest objective function value becomes q% or greater.
3) The value of the greatest objective function is not updated at the subsequent p-th generation.

M, q and p are input in advance by the user.

In this manner, in the present embodiment, since the differences between rigidities of the pitch groups can be made uniform, shapes of lug grooves, shapes of rib grooves, shapes of sipes and the like of the tire can be made appropriately and a shape at a position in widthwise direction of a tire can be made appropriately, in accordance with required performances such as cornering performance and straight running performance, and uneven wear resistance and running performance can both be established at high levels.

Fourth Embodiment

Next, a fourth embodiment will be described. Although pitches or differences between rigidities of the pitch groups are uniformized in the previous embodiments, in the present embodiment, the groove wall angle is optimized to uniformize the tread thickness. Since the present embodiment is structured substantially the same as the previous embodiments, the same portions are denoted by the same reference symbols, and their detailed descriptions will be omitted.

Figure 24:
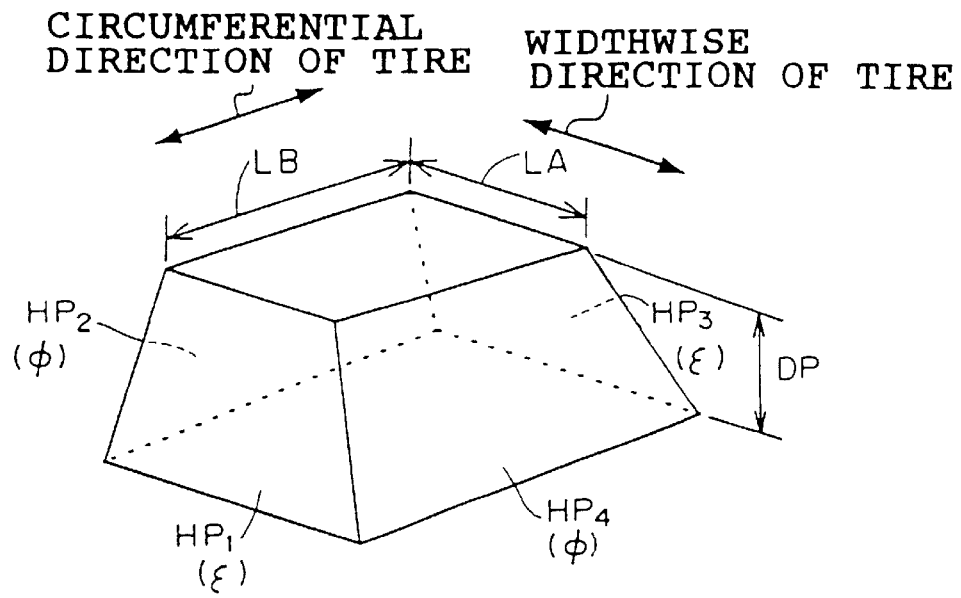
FIG. 24 is a diagram showing a block according to a fourth embodiment.

As shown in FIG. 24, the block shape has a long side having a length LB in the tire circumferential direction, and a short side having a length LA in the tire widthwise direction which is perpendicular to the tire circumferential direction, and a height DP. The groove wall angles of the groove walls $HP_1$ and $HP_3$ which are continuous with the short sides having the length LA are both set to $\epsilon$. The groove wall angles of the groove walls $HP_2$ and $HP_4$ which are continuous with the long sides having the length LB are both set to $\phi$.

The groove wall angles ε and φ of the block are optimized as described in the previous embodiments. In the present embodiment, in order to uniformize the uniformity of the tire shape, the objective function OBJ and the constraint condition G are set as follows:

Objective function OBJ: Tread thickness constraining the tire shape is made uniform.

Constraint condition G: Differences among the block rigidities are made uniform.

In the present embodiment, because the tread thickness of the pitches or the pitch groups can be made uniform, unevenness of the tire tread thickness can be overcome without being influenced by the magnitudes of the pitches of the pitch array formed at the tire tread portion.

Figures 25A, 25B:
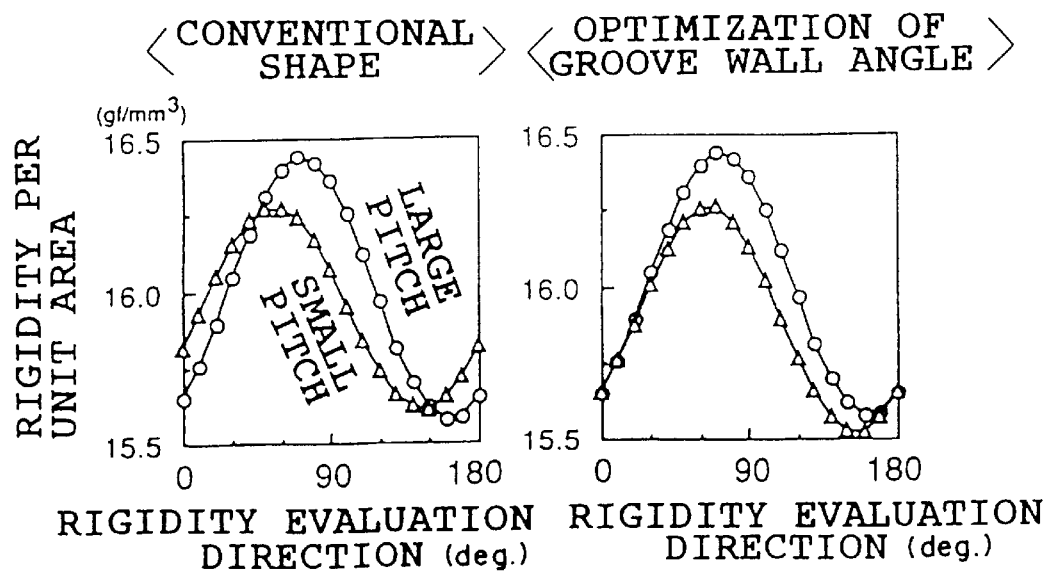

As a result of optimization of the block by the objective function and the constraint condition, a groove wall angle $\epsilon=10°$ and a groove wall angle $\phi=3.5°$ were obtained for the small pitch, and a groove wall angle $\epsilon=3°$ and a groove wall angle $\phi=10°$ were obtained for the large pitch. The difference in tread thickness at this time improved to 0.01 mm whereas the conventional difference was 0.08 mm. FIGS. 25A and 25B show rigidities per unit area with respect to direction, i.e., FIG. 25A shows conventional rigidities before optimization for uniformizing the thickness of a tread, and FIG. 25B shows rigidities after optimization for uniformizing the thickness of a tread according to the present embodiment. In the present embodiment, uniformity of the tire shape is uniformized, and as can be understood from FIGS. 25A and 25B, the difference in rigidities of pitches substantially coincides with or is even slightly enhanced over the conventional shape.

Fifth Embodiment

A fifth embodiment will be described next. In the previous embodiments, although differences between rigidities of pitches or pitch groups was uniformized, the difference in rigidities of pitches was enhanced only slightly. The present embodiment is to optimize the groove wall angle to uniformize the tread thickness and to uniformize the differences between rigidities of pitches or pitch groups. Since the present embodiment is structured substantially the same as the above-described embodiments, the same portions are denoted by the same reference symbols, and their detailed descriptions will be omitted.

When the groove wall angle is optimized, since a distance between adjacent blocks and the groove depth also is determined by the pitch array, the groove wall angle has a range in which the angle can vary. Accordingly, there are limits to the optimization by only the groove wall angle. In the present embodiment, in order to uniformize the tread thickness and to uniformize differences between rigidities of pitches or pitch groups, an amount of bottom raise is introduced into the design variable.

Figure 26:
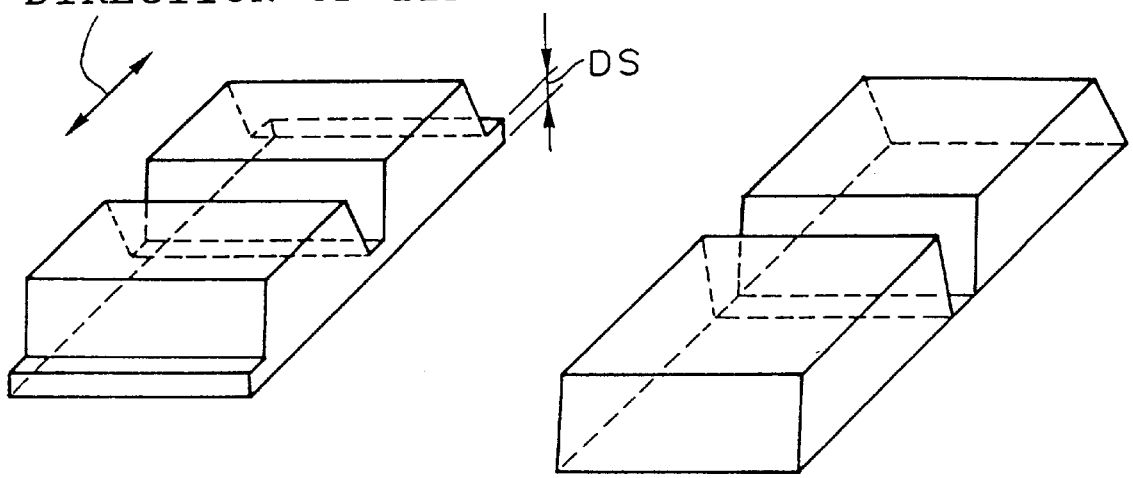
FIG. 26 is a perspective view showing adjacent blocks for explaining an amount of bottom raise.
Figure 27:
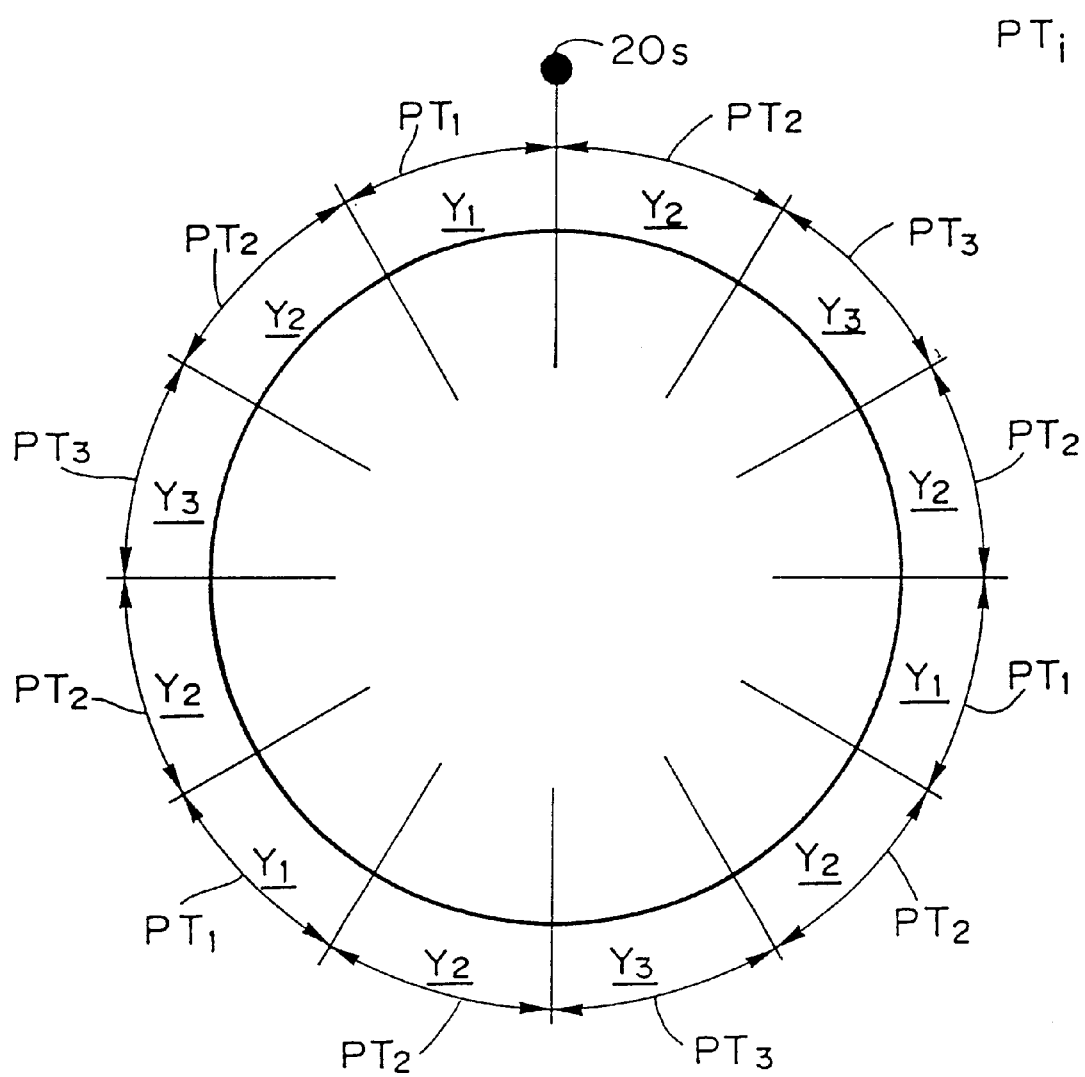
FIG. 27 is an image view showing a shape of a tire according to a fifth embodiment.

As shown in FIG. 26, the amount of bottom raise is a height DS from a tread between adjacent blocks. Further, as shown in FIG. 27, a tire 20 which is determined by the pitch array V of the present embodiment comprises three kinds of pitches, i.e., a small pitch $Y_1$, a medium pitch $Y_2$ and a large pitch $Y_3$. Formed on the tire 20 are a pitch group $PT_1$ in which eight small pitches $Y_1$ are continuously arranged, a pitch group $PT_2$ in which four medium pitches $Y_2$ are continuously arranged, and a pitch group $PT_3$ in which five large pitches $Y_3$ are continuously arranged. In the example shown in FIG. 27, the pitch array V is formed such that pitch groups $PT_2$, $PT_3$, $PT_2$, $PT_1$, $PT_2$, $PT_3$, $PT_2$, $PT_1$, $PT_2$, $PT_3$, $PT_2$ and $PT_1$ are arranged continuously in a clockwise direction from the reference point 20s of the tire 20.

In the present embodiment, although it is described that each of the pitch groups $PT_1$, $PT_2$ and $PT_3$ comprises a plurality of pitch in which the small pitch $Y_1$, the medium pitch $Y_2$ and the large pitch $Y_3$ are arranged continuously, the present invention should not be limited to this only, and each of pitch groups $PT_1$, $PT_2$, $PT_3$ may comprise a single pitch. That is, at least one of the pitch groups $PT_1$, $PT_2$, $PT_3$ may only comprise any one of the small pitch $Y_1$, the medium pitch $Y_2$ and the large pitch $Y_3$.

For the tire 20 having a plurality of pitch groups in which the predetermined pitches are continuous and having a plurality of different pitch groups, the groove wall angle and the amount of bottom raise are optimized, and optimization is conducted to uniformize the tread thickness and to uniformize the differences between rigidities of the pitches or pitch groups. In the present embodiment, the amount of bottom raise is further added as a design variable to the design variables of the previously-described embodiments.

In the present embodiment, since the tread thickness and the differences between rigidities of the pitches or pitch groups can be uniformized among each of the pitches or each of the pitch groups, unevenness of the tire tread thickness can be overcome without being influenced by the magnitude of the pitches of the pitch array formed at the tire tread portion, and differences between rigidities of the pitches or pitch groups can be uniformized.

Figure 28:
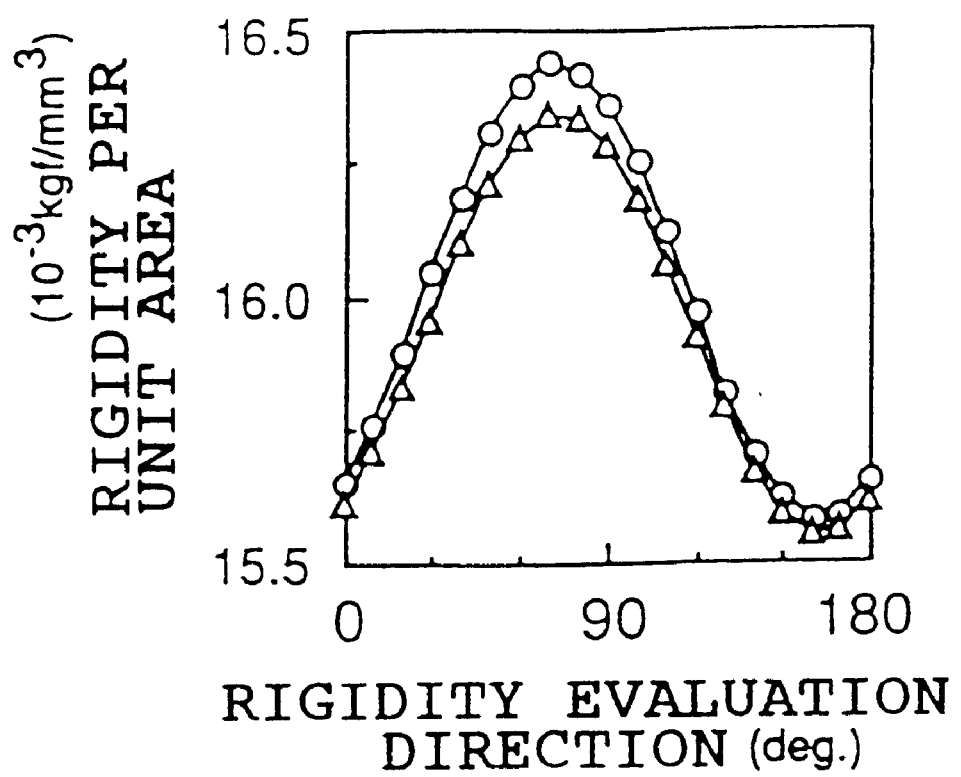
FIG. 28 is a diagram showing rigidity per unit area with respect to direction after optimization for making thickness uniform and making rigidity uniform according to the fifth embodiment.

As a result of optimization of a block by the objective function, the constraint condition and the design variables, a small pitch having a groove wall angle $\epsilon=10°$, a groove wall angle $\phi=2°$ and a bottom raise amount of 1 mm, as well as a large pitch having a groove wall angle $\epsilon=3°$ and a groove wall angle $\phi=10°$ were obtained. The difference in tread thickness at that time was 0.01 mm. FIG. 28 shows a rigidities per unit area with respect to direction. As can be understood from the drawing, uniformity of tire shape is uniformized, and the differences in rigidities of pitches are made to substantially coincide.

Figures 29A, 29B, 29C, 29D:
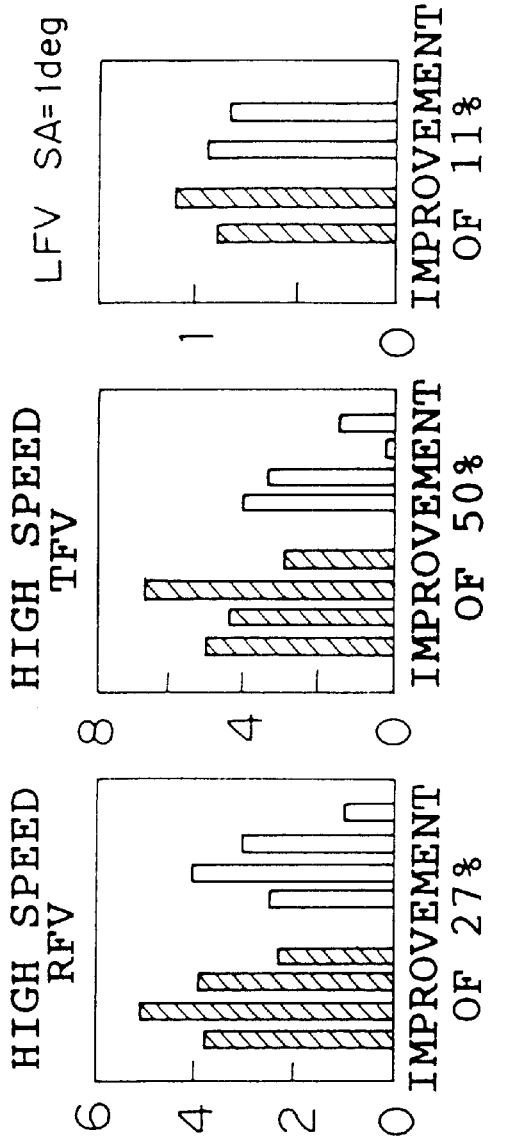

A tire was made by using the pitch array according to the above described block structure, and its effects were tested. The results will be described below. A 195/65R14 tire having three pitches and three mountain shaped arrays was prepared, and indoor uniformity was measured. FIG. 29 shows the results. FIG. 29A shows the results of RFV (speed: 10 km/h), FIG. 29B shows the results of high speed RFV (speed: 120 km/h), FIG. 29C shows the results of high speed TFV (speed: 10 km/h) and FIG. 29D shows the results of LFV (speed: 120 km/h). In the drawings, the bars with slanted lines show the results of a conventional tire, and the white bars show the results of the tire to which the present embodiment is applied. As can be understood from the drawings, the tire according to the present embodiment is improved by 11% to 50% as compared with the conventional tire. Further, the tire was mounted to a vehicle, steering stability was measured, and as a result, it was found that the steering stability was improved by 6.5 whereas the conventional steering stability was 5.5.

Further, in order to test the rigidity of a tire having the above described pattern, straight pushing loads of 20 mm were compared. This test was conducted by using FEM analysis. If there was a difference of about 2% in block rigidity, a model in which only small pitches were arranged on the ground-contacting surface had 350.5 kgf, and a model in which only large pitches were arranged on the ground-contacting surface had 352.1 kgf, and thus, a difference of 1.6 kgf arose. As a result of optimizing, the groove wall angle and the bottom raise amount and optimizing in order to uniformize the tread thickness and differences between rigidities of pitches or pitch groups as in the present embodiment the small pitch was enhanced by 352.0 kgf, and difference between rigidities was enhanced by 0.1 kgf.

Next, the present inventor tested the effect of uniformizing the tread thickness. A tire was prepared according to the design of the present embodiment in the same way as described above, and the tread thickness was measured. FIG. 30 shows the results. As can be understood from the drawing, the conventional tire had 0.12 mm variability in tread thickness, whereas the tire of the present invention had 0.05 mm variability in tread thickness including a measuring error of about 0.02 mm. In order to test the rigidity of the tire, straight pushing loads of 20 mm were compared. This test was conducted by using FEM analysis. If the tread thickness was increased by 0.1 mm, the rigidity increased from 352.1 kgf to 353.4 kgf, i.e., the rigidity increased by 1.3 kgf.

Next, different tires were prepared and tested. Here, RE711 tires were prepared. FIGS. 31A and 31B are diagrams showing rigidities per unit area with respect to direction, i.e., FIG. 31A shows conventional rigidities, and FIG. 31B shows rigidities after optimization according to present embodiment for uniformizing both tread thickness and rigidity. As can be understood from FIGS. 31A and 31B, differences between rigidities of pitches substantially coincide as compared with the conventional tire.

Sixth Embodiment

Next, a sixth embodiment will be described. In the above embodiments, the shape was optimized. In the present embodiment, in order to suppress variations in the ground-contacting characteristic, the structure is changed. Since the sixth embodiment is structured substantially the same as the first embodiment, the same portions are denoted by the same reference symbols, and their detailed descriptions will be omitted.

Figure 32:
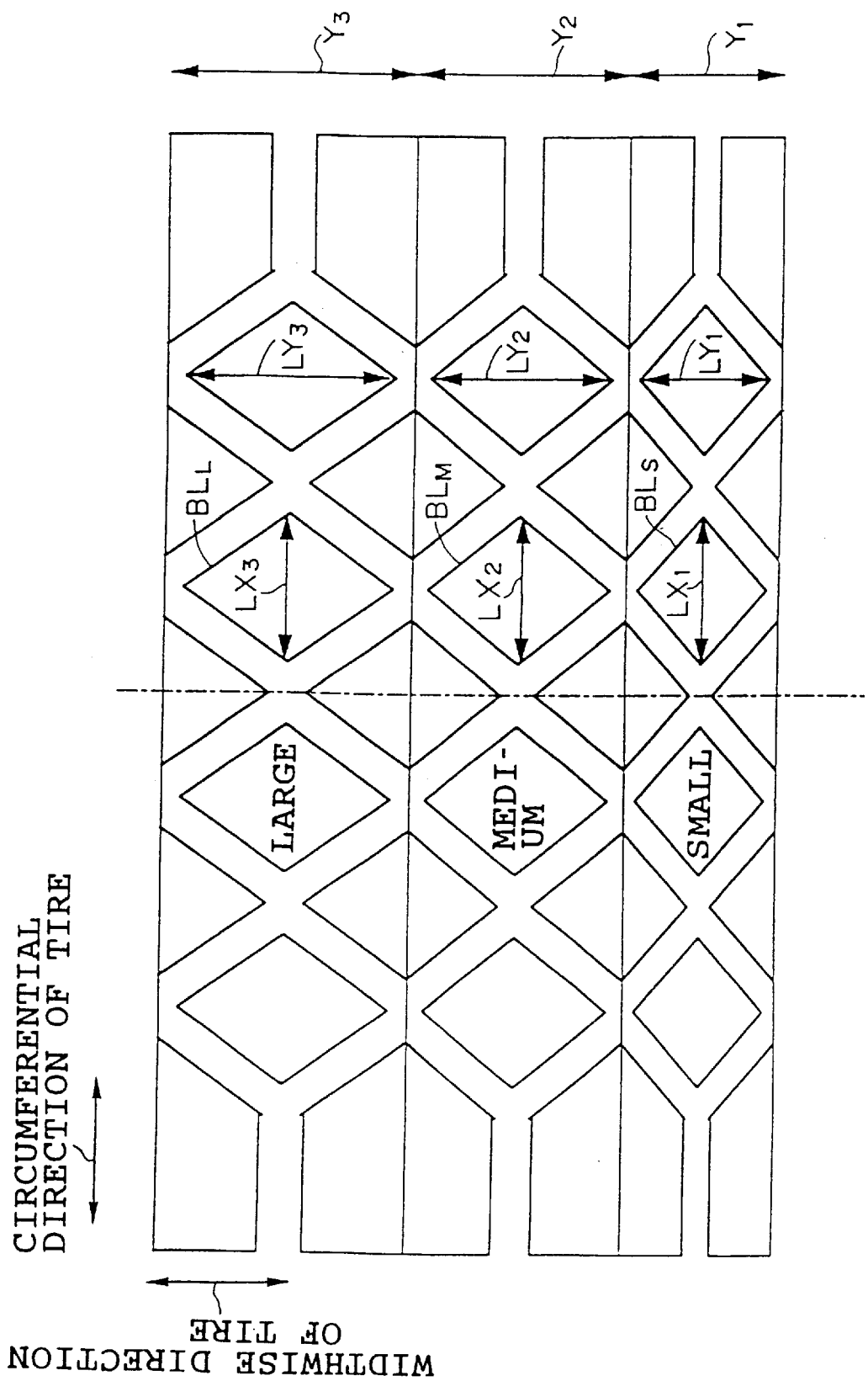
FIG. 32 is a diagram showing a tread pattern which is continuous from small pitch to large pitch according to a sixth embodiment.

In the present embodiment, the tire 20 determined by a pitch array V shown in FIG. 27 is employed. As one example, a case in which a 195/65R14 tire having a groove depth of 7.0 is used is described. In the present embodiment, a rhombic block among rectangular blocks is used. FIG. 32 shows a tread pattern in which a small pitch $Y_1$, a medium pitch $Y_2$ and a large pitch $Y_3$ are continuously arranged. A block $BL_S$ of the small pitch $Y_1$ has a length $LX_1$ in the tire widthwise direction and a length $LY_1$ in the tire circumferential direction. A block BLM of the medium pitch $Y_2$ has a length $LX_2$ in the tire widthwise direction and a length $LY_2$ in the tire circumferential direction. Similarly, a block $BL_L$ of the large pitch $Y_3$ has a length $LX_3$ in the tire widthwise direction and a length $LY_3$ in the tire circumferential direction. In the present embodiment, as one example, there is described a case in which the three blocks are set to the same length (=24 mm), i.e., $LX_1=LX_2=LX_3$, and $LY_1=21$, $LY_2=27$ and $LY_3=33$.

Figure 33A:
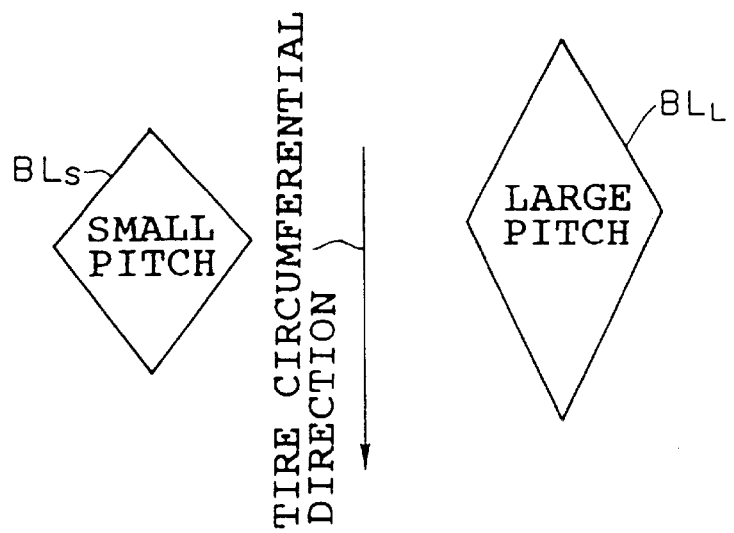
FIG. 33A is a diagram showing directivity of small pitch and large pitch block shapes.
Figure 33B:
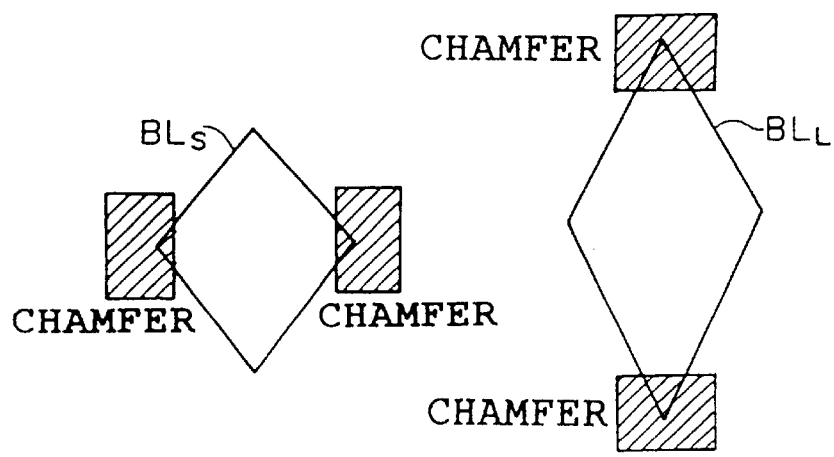
FIG. 33B is an image view showing positions to be chamfered at small pitch and large pitch blocks.
Figure 33C:
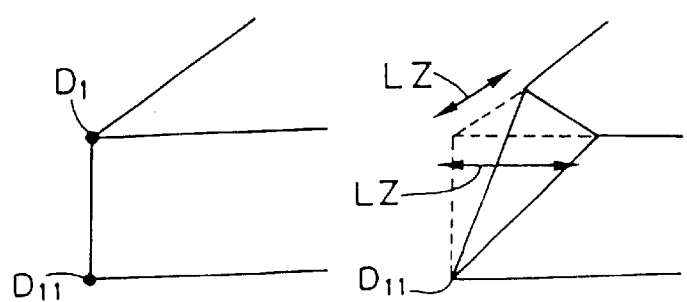
FIG. 33C is a diagram showing the way to chamfer.

Next, positions to be chamfered and method of chamfering according to the present embodiment will be described. FIG. 33A shows one example of the block $BL_S$ of the small pitch $Y_1$ and the block $BL_L$ of the large pitch $Y_3$. Since the block is rhombic, it has four angles, and opposed angles have substantially the same shapes. As shown in FIG. 33B, the two tire widthwise direction angles of the block $BL_S$ of the small pitch $Y_1$ are chamfered, and the two tire circumferential direction angles of the block $BL_L$ of the large pitch $Y_3$ are chamfered. As shown in FIG. 33C, the chamfering is conducted such that the chamfering is started from a position at a predetermined length LZ along a ridge line from the ground-contact surface sidepoint $D_1$ among the vertexes $D_1$ and $D_{11}$ before chamfering, and the block is cut toward the tread side point $D_{11}$. By chamfering in this manner, uniformity of differences between rigidities of the blocks can be improved.

Although an example has been described above of a case in which angles in one of the tire circumferential direction and the tire widthwise direction are chamfered, the present invention is not limited to the same, and chamfering can be conducted for at least one of the tire circumferential direction and the tire widthwise direction for each of the blocks.

Further, the chamfering method is not limited to cutting toward the tread side point $D_{11}$, and the block may be cut at a depth equal to the predetermined length LZ along the ridge line, or may be cut to a predetermined depth.

Next, examples of the sixth embodiment will be described.

First Example

In the present example, the blocks are chamfered in the tire circumferential direction. As shown in FIG. 34, in this example, the blocks $BL_S$ of the small pitch $Y_1$ were not chamfered. The blocks $BL_M$ of the medium pitch $Y_2$ were chamfered 2 mm at the angles in the tire circumferential direction, and the blocks $BL_L$ of the large pitch $Y_3$ were chamfered 5 mm at the angles in the tire circumferential direction.

Next, the present inventor tested, by using FEM analysis, block rigidities of the blocks which were chamfered as described above, and obtained the results shown in FIG. 35. FIG. 35A shows rigidities of blocks per unit area with respect to each of the small pitch and large pitch of a normal design without chamfering, and FIG. 35B shows rigidities of blocks per unit area with respect to each of the chamfered small pitch and large pitch according to the present example. As can be understood from the drawings, uniformity of the block rigidities is enhanced.

Further, the present inventor applied the above-described blocks to a tire and carried out tests. As a result of measurement of indoor uniformity, it was found that the third degree component was enhanced, RFV was enhanced by 10%, and TFV was enhanced by 15%. Further, the tire was mounted to a vehicle and steering stability was measured, and as a result, it was found that the steering stability was enhanced by 5.5 whereas the conventional steering stability was 5.0.

Second Example

Figure 36:
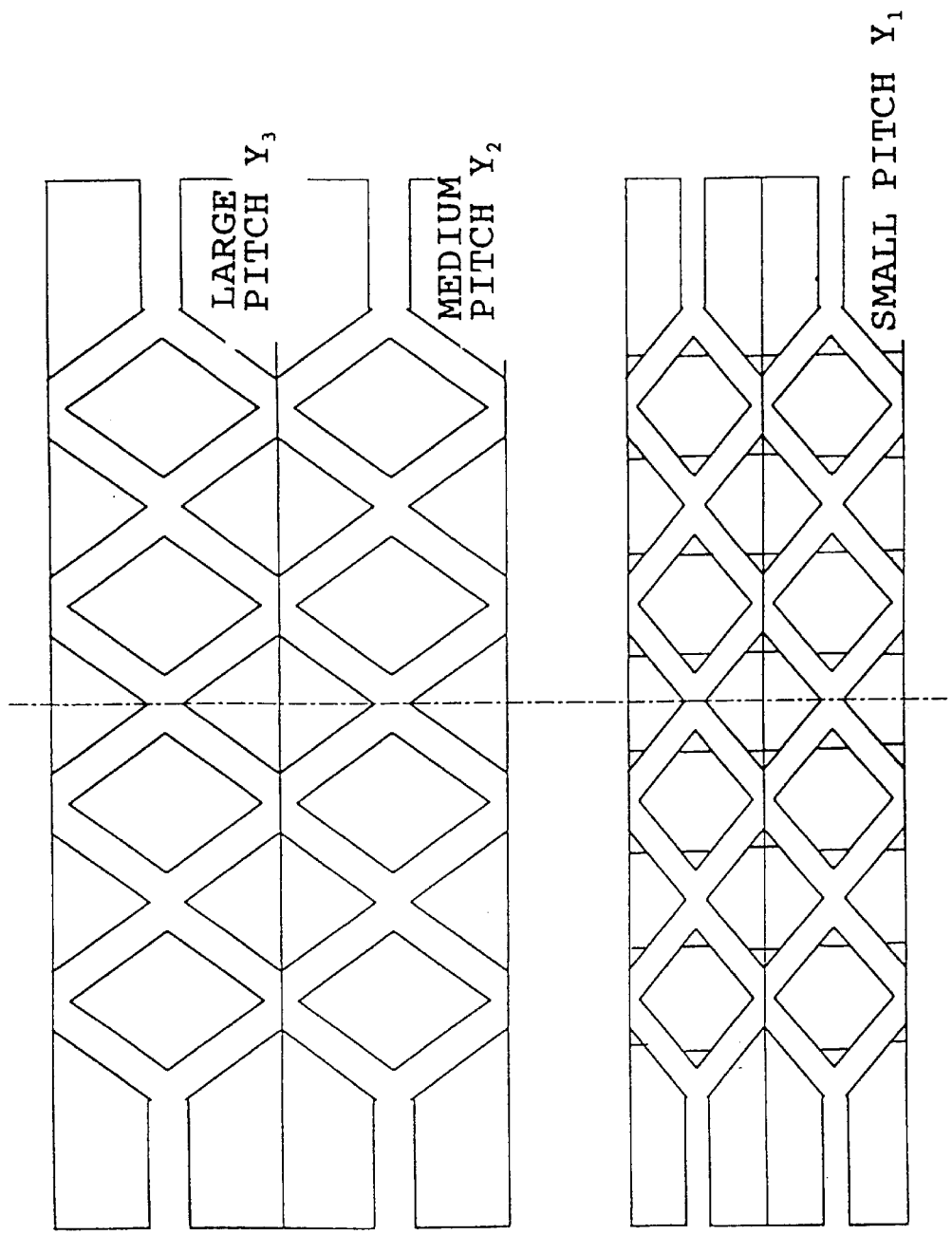
FIG. 36 is a view for explaining positions to be chamfered in the widthwise direction of the tire for small pitch, medium pitch and large pitch blocks according to the second example.

In the present example, blocks were chamfered in the tire widthwise direction. As shown in FIG. 36, in this example, blocks $BL_L$ of the large pitch $Y_3$ were not chamfered. Blocks $BL_S$ of the small pitch $Y_1$ were chamfered 2 mm at the angles in the tire widthwise direction, and blocks $BL_M$ of the medium pitch $Y_2$ were chamfered 0.8 mm at the angles in the tire widthwise direction.

Figure 37A:
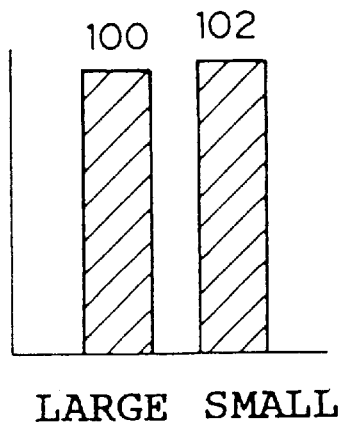
Figure 37B:
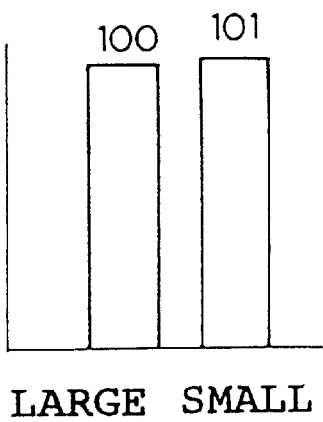

Next, the present inventor tested, by using FEM analysis, block rigidities of the blocks which were chamfered as described above, and obtained the results shown in FIGS. 37A and 37B. FIG. 37A shows rigidities of blocks per unit area with respect to each of the small pitch and large pitch of a normal design without chamfering, and FIG. 37B shows rigidities of blocks per unit area with respect to each of the chamfered small pitch and large pitch according to the present example. As can be understood from the drawings, uniformity of the block rigidities is enhanced.

Further, the present inventor applied the above-described blocks to a tire and carried out tests. As a result of measurement of indoor uniformity, it was found that the third degree component was enhanced, RFV was enhanced by 10%, and TFV was enhanced by 10%. Further, the tire was mounted to a vehicle and steering stability was measured, and as a result, it was found that the steering stability was enhanced by 5.25 whereas the conventional steering stability was 5.0.

Third Example

In the present example, blocks of an actual tire were chamfered. In this example, a 275/40ZR18 type tire having a one side tread width of 140 mm and a pitch length of 50.91:80.01 was employed.

Figure 38:
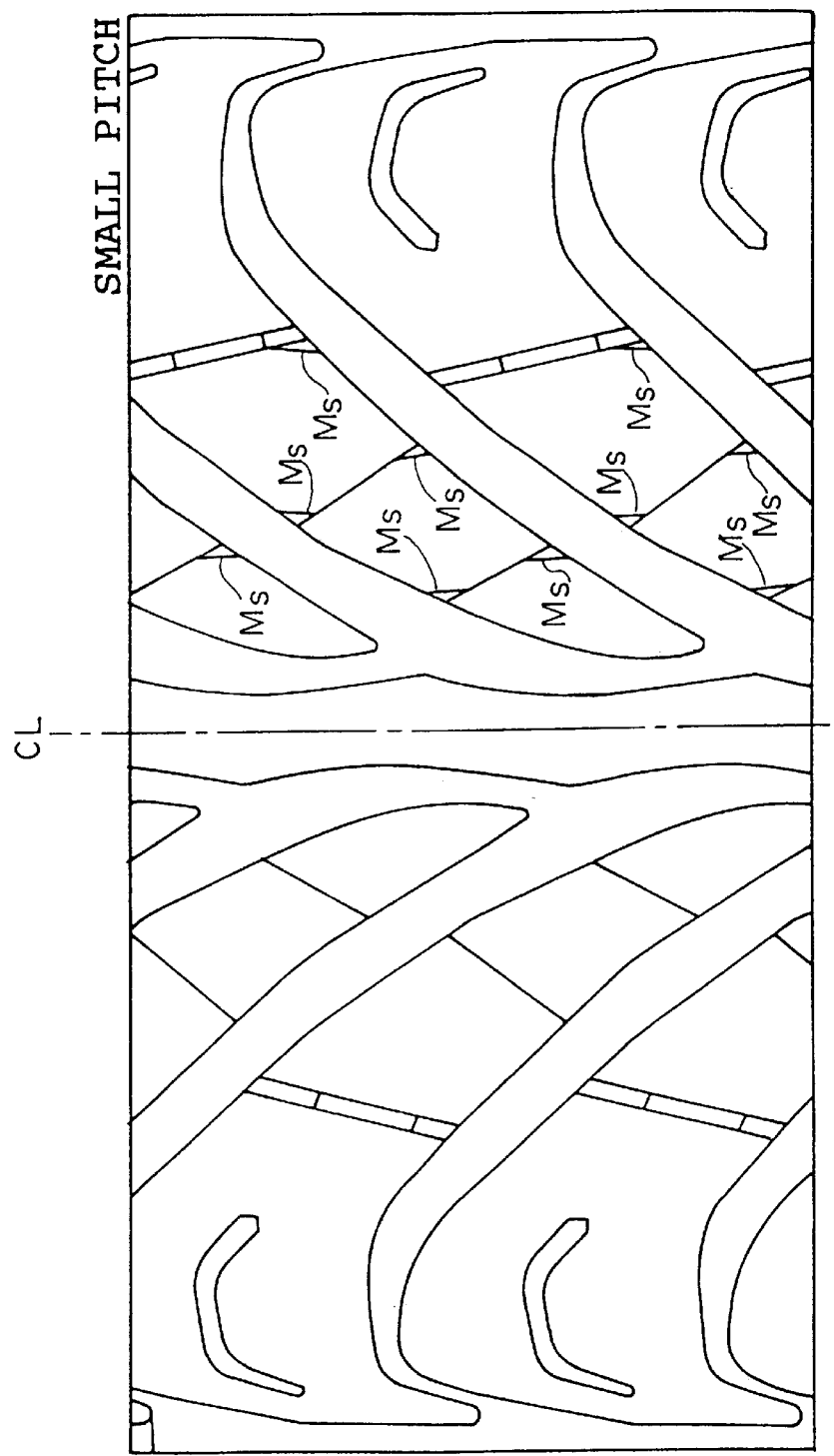
FIG. 38 is a view for explaining positions to be chamfered in the widthwise direction of the tire for small pitch blocks according to the third example.
Figure 39:
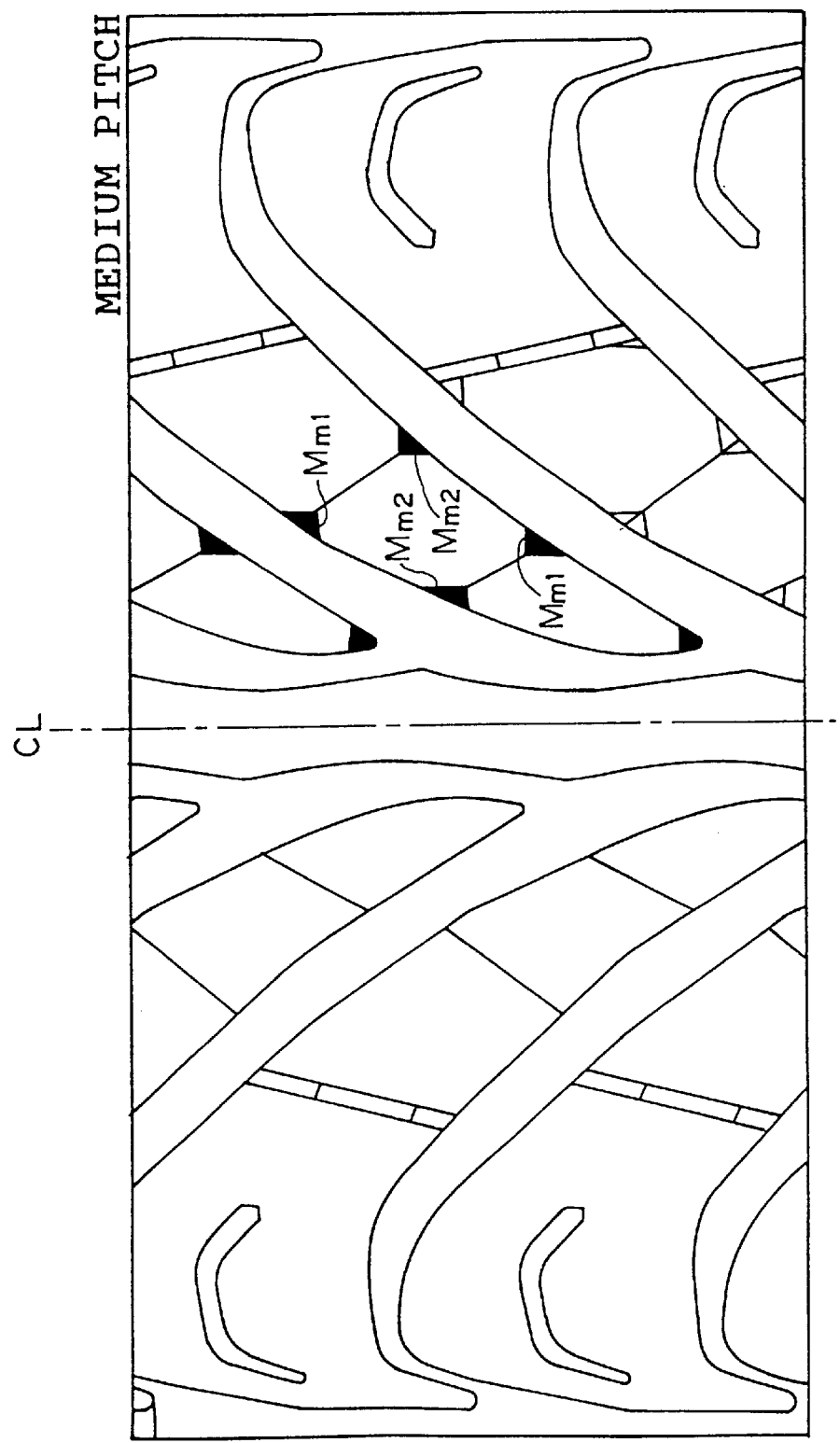
FIG. 39 is a view for explaining positions to be chamfered in the widthwise direction and the circumferential direction of the tire for a medium pitch block according to the third example.
Figure 40:
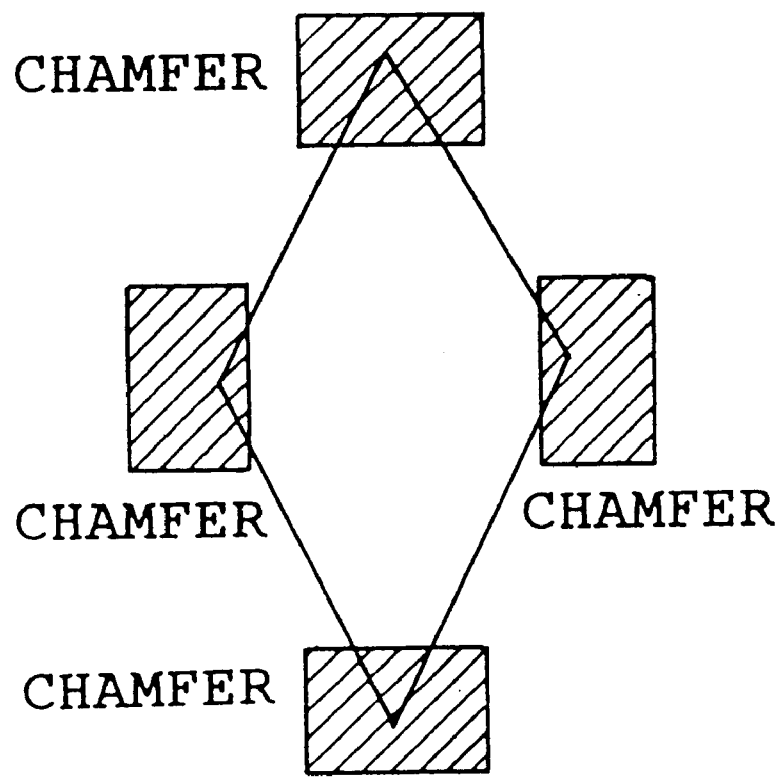
FIG. 40 is a view for explaining positions to be chamfered for a medium pitch block according to the third example.
Figure 41:
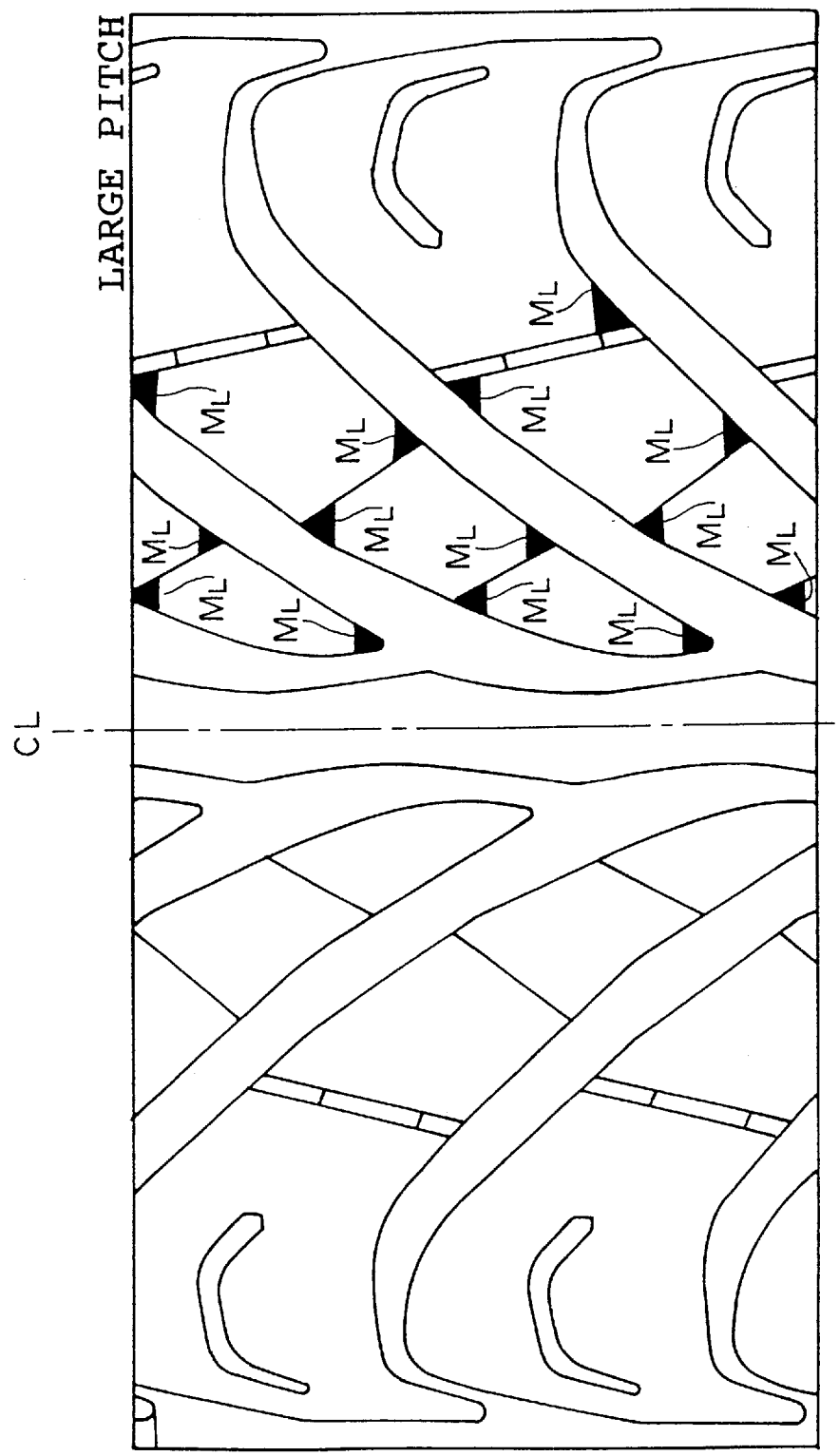
FIG. 41 is a view for explaining positions to be chamfered in a circumferential direction of the tire for a large pitch block according to the third example.

As shown in FIG. 38, in the present example, blocks $BL_S$ of the small pitch $Y_1$ were chamfered Ms by 2 mm at angles in the tire widthwise direction. That is, as shown in left side in FIG. 33B, the two angles in the tire widthwise direction of each of the blocks of the small pitch $Y_1$ were chamfered. Further, as shown in FIG. 39, at blocks $BL_M$ of the medium pitch $Y_2$, angles in the tire widthwise direction were chamfered $Mm_2$ by 1 mm, and angles in the tire circumferential direction were chamfered $Mm_1$ by 2 mm. That is, as shown in FIG. 40, two angles in the tire widthwise direction and two angles in the tire circumferential direction of each of the blocks of the medium pitch $Y_2$ were chamfered. Furthermore, angles in the tire circumferential direction of the blocks $BL_L$ of the large pitch $Y_3$ were chamfered by 4 mm. That is, as shown in the right side in FIG. 33B, two angles in the tire circumferential direction of each of the blocks of the large pitch $Y_3$ were chamfered $M_L$.

The present inventor measured the steering stability for a tire which was chamfered as described above and which was mounted to a vehicle. As a result, it was found that the steering stability was enhanced by 6.5 whereas the conventional steering stability was 5.5.

The examples of the present invention have been described above. However, the examples of the present invention include the following various technical matters.

A pneumatic tire of a shape designed by a method for designing a pneumatic tire, wherein the shape of the pneumatic tire is designed based on a tire basic model comprising a small pitch basic shape model and a large pitch basic shape model as a pattern shape of a portion of a tire crown portion including an internal structure and a shape of ridge portion which is continuous in a tire circumferential direction including an internal structure, and when the blocks include an angle in at least one of a circumferential direction and a widthwise direction, angles in the widthwise direction of small pitch blocks are chamfered, and angles in the circumferential direction of the large pitch are chamfered.

In this pneumatic tire the angles in the widthwise direction of the large pitch are smaller than angles in the widthwise direction of the small pitch, and/or angles in the circumferential direction of the small pitch are smaller than angles in the circumferential direction of the large pitch, and a medium pitch is provided between the large pitch and the small pitch.

This is for suppressing variation in the ground-contact characteristic due to variation in sizes of the blocks during one revolution of the tire, and for enhancing the steering stability and uniformity (so-called uniformizing).

It is thereby possible to make the levels of the ground-contact characteristic during revolution of the tire due to differences in sizes of the blocks substantially coincide. More specifically, the block rigidity is made the same level, and deformation of the block and generation of force in each of the pitches are made to approach the same direction.

POSSIBILITY OF INDUSTRIAL UTILIZATION

As described above, the method for designing a pneumatic tire according to the present invention is optimal for use in designing a tire of a pitch array comprising a plurality of pitches for example, and is especially suitable for use in designing to uniformize the rigidities and uniformity which are assumed to cause variation in shape.

What is claimed is:

1. A method for designing a pneumatic tire including the steps of:
   (1) selecting one shape from among:
      a shape of a block alone including an internal structure,
      a pattern shape of a portion of a tire crown portion including an internal structure, and
      a shape of a land portion which is continuous in a tire circumferential direction including an internal structure;
   (2) determining at least one tire basic model including a plurality of different basic shape models representing the selected one shape;
   (3) determining an objective function representing a tire performance evaluation physical amount, said objective function related to respective tire performance evaluation physical amounts of at least two basic shape models in the plurality of different basic shape models;
   (4) determining a design variable for determining each of the plurality of different basic shape models;
   (5) determining a constraint condition which restricts at least one of:
      the shape of a block alone including an internal structure,
      the pattern shape of a portion of a tire crown portion including an internal structure, and
      the shape of a land portion which is continuous in a tire circumferential direction including an internal structure;
      a tire cross-sectional shape, and
      the tire performance evaluation physical amount;
   (6) varying at least one basic shape model in the at least two basic shape models, by varying value of said design variable of the at least one basic shape model;
   (7) obtaining an optimal value of said design variable of the at least one basic shape model, by which an optimal value of said objective function is obtained and which satisfies said constraint condition, from the varied values of said design variable of the at least one basic shape model; and
   (8) designing said pneumatic tire on the basis of the optimal value of said design variable.

2. A method for designing a pneumatic tire according to claim 1, wherein said step of obtaining an optional value of said design variable, comprises:
   estimating an amount of variation of the design variable which provides the optimal value of the objective function while the constraint condition is satisfied, based on a sensitivity of the objective function and based on a sensitivity of the constraint condition, wherein the sensitivity of the objective function is a ratio of a unit amount of variation of the design variable to an amount of variation of the objective function, and the sensitivity of the constraint condition is a ratio of a unit amount of variation of the design variable to an amount of variation of the constraint condition;

calculating a value of the objective function when the design variable is varied by an amount corresponding to the estimated amount, and calculating a value of the constraint condition when the design variable is varied by an amount corresponding to the estimated amount; and determining, based on the estimated value and the calculated values, a value of the design variable which provides the optimal value of the objective function while the constraint condition is satisfied.

3. A method for designing a pneumatic tire according to claim 1, wherein:

(a) said step of determining at least one tire basic model includes determining a selection group including a plurality of tire basic models each including a of different basic shape models each representing one shape selected from among a shape of a block alone including an internal structure, a pattern shape of a portion of a tire crown including an internal structure, and a shape of a land portion which is continuous in a tire circumferential direction including an internal structure; and (b) said step of determining the objective function representing tire performance evaluation physical amount, said step of determining the design variable, and said step of determining the constrain condition are performed for each of the tire basic models of the selection group;

and the method further comprising:

(c) determining for each of the tire basic models of the selection group and adaptive function which can be evaluated from the objective function and the constraint condition (d) selecting two basic models from the selection group on the basis of the adaptive function;

(e) crossing design variables of the tire basic models at a predetermined probability and/or varying a portion of the design variable of at least one of the tire basic models to create a new tire basic model;

(f) determining an objective function, a constraint condition and an addaptive function of the tire basic model whose design variable has been varied;

(g) storing the tire basic model whose design variable has been varied and a tire basic model whose design variable has not been varied;

(h) repeating (d) through (f) until the number of stored tire basic models reaches a predetermined number;

(i) determining whether a new group including the predetermined number of stored tire basic models satisfies a predetermined convergence condition, and when the convergence condition is not satisfied, repeating (d) through (f) by using the new group as the selection group, until the selection group satisfies the convergence condition, and when the convergence condition is satisfied determining from among the predetermined number of sorted tire basic models a value of the design variable which provides the optimal value of the objective function while the constraint condition is satisfied.

4. A method for designing a pneumatic tire according to claim 3, wherein in said step of determining at least one tire basic model each of the tire basic models includes a plurality of basic shape models each having a different length in the tire circumferential direction.

5. A method for designing a pneumatic tire according to claim 4, wherein the tire basic model includes a small pitch basic shape model of a block and a large pitch basic shape model of a block and the design variable is chamfering so that each of said blocks has a chamfer between surfaces of the block in one of a circumferential direction or a widthwise direction, wherein said chamfer is respectively in a widthwise direction for a small pitch block and a circumferential direction for a large pitch block.

6. A method for designing a pneumatic tire according to claim 5, wherein the chamfer of said block in the widthwise direction for a large pitch block is smaller than the chamfer of said block in the widthwise direction for a small pitch, and the chamfer of said block in the circumferential direction for the small pitch block is smaller than the chamfer in the circumferential direction for a large pitch block.

7. A method for designing a pneumatic tire according to claim 5, further comprising a medium pitch block provided between the large pitch block and the small pitch block.

8. A method of designing a pneumatic tire according to claim 1, wherein said design variable represents at least one of:

an angle between:
a surface of the tire land portion which is formed by the one shape selected from the shape of the block alone, the pattern shape, and the shape of the land portion, and
a surface connected to the surface of the tire land portion;

a height to the surface of the tire land portion;

a shape of a surface connected to a surface of the tire land portion;

a position of a sipe;

a number of sipes;

a width of a sipe;

a depth of a sipe;

an inclination of a sipe;

a shape of a sipe; and a longitudinal shape of a sipe.

9. A method for designing a pneumatic tire according to claim 1, wherein on the basis of one basic shape model among the plurality of different basic shape models, other basic shape models of the plurality of different basic shape models are determined.

10. A method for designing a pneumatic tire according to claim 1, wherein on the basis of a predetermined basic shape model, each of the plurality of different basic shape models is determined.

11. A method for designing a pneumatic tire according to claim 1, wherein said plurality of different basic shape models are arranged in a circumferential direction of the tire.

12. The method of claim 1, wherein said design variable is chamfering.

13. A method for designing a pneumatic tire including the steps of:

selecting one shape from among:
a shape of a block alone including an internal structure,
a pattern shape of a portion of a tire crown portion including an internal structure, and
a shape of a land portion which is continuous in a tire circumferential direction including an internal structure;

determining one tire basic model including a plurality of different basic shape models representing the selected one shape;

determining an objective function representing a tire performance evaluation physical amount, said objective function is related to respective tire performance evaluation physical amounts of two basic shape models (PT1, PT2 or PT1, PT3 or PT2, PT3) in the plurality of different basic shape models;

determining a design variable for determining each of the plurality of different basic shape models;

determining a constraint condition which restricts at least one of:

the shape of a block alone including an internal structure, the pattern shape of a portion of a tire crown portion including an internal structure, and the shape of a land portion which is continuous in a tire circumferential direction including an internal structure;

a tire cross-sectional shape, and the tire performance evaluation physical amount;

varying the two basic shape models (PT1 and PT2), by varying values of said design variables of the two basic shape models;

obtaining optimal values of said design variables of the two basic shape models by which an optimal value of said objective function is obtained and which satisfies said constraint condition, from the varied values of said design variables of the two basic shape models; and designing said pneumatic tire on the basis of the optimal values of said design variables.

14. The method of claim 13, wherein each said design variable is chamfering.

15. A method of designing a pneumatic tire including the steps of:

selecting one shape from among:

a shape of a block alone including an internal structure, a pattern shape of a portion of a tire crown portion including an internal structure, and a shape of a land portion which is continuous in a tire circumferential direction including an internal structure;

determining one tire basic model including a plurality of different basic shape models representing the selected one shape;

determining an objective function representing a tire performance evaluation physical amount, said objective function being related to respective tire performance evaluation physical amounts of one basic shape model (PT1 or PT2 or PT3) in the plurality of different basic shape models and a predetermined reference basic shape model;

determining a design variable for determining each of the plurality of different basic shape models;

determining a constraint condition which restricts at least one of:

the shape of a block alone including an internal structure, the pattern shape of a portion of a tire crown portion including an internal structure, and the shape of a land portion which is continuous in a tire circumferential direction including an internal structure;

a tire cross-sectional shape, and the tire performance evaluation physical amount;

varying the one basic shape model by varying value of said design variable for the one basic shape model;

obtaining optimal value of said design variable of the one basic shape model by which an optimal value of said objective function is obtained and which satisfies said constraint condition, from the varied value of said design variable of the one basic shape model; and designing said pneumatic tire on the basis of the optimal value of said design variable.

16. The method of claim 15, wherein said design variable is chamfering.

* * * * *